United States Patent
Stripf

(10) Patent No.: US 11,934,835 B2
(45) Date of Patent: Mar. 19, 2024

(54) COMPUTER SYSTEM AND METHOD FOR VALIDATION OF PARALLELIZED COMPUTER PROGRAMS

(71) Applicant: emmtrix Technologies GmbH, Karlsruhe (DE)

(72) Inventor: Timo Stripf, Karlsruhe (DE)

(73) Assignee: emmtrix Technologies GmbH, Karlsruhe (DE)

( * ) Notice: Subject to any disclaimer, the term of this patent is extended or adjusted under 35 U.S.C. 154(b) by 0 days.

(21) Appl. No.: 18/156,237

(22) Filed: Jan. 18, 2023

(65) Prior Publication Data

US 2023/0153112 A1 May 18, 2023

Related U.S. Application Data

(63) Continuation of application No. PCT/EP2021/068082, filed on Jun. 30, 2021.

(30) Foreign Application Priority Data

Jul. 22, 2020 (EP) .................................... 20187124

(51) Int. Cl.
*G06F 9/38* (2018.01)
*G06F 9/30* (2018.01)

(52) U.S. Cl.
CPC .......... *G06F 9/3838* (2013.01); *G06F 9/3005* (2013.01)

(58) Field of Classification Search
CPC .................................................... G06F 9/3838
See application file for complete search history.

(56) References Cited

U.S. PATENT DOCUMENTS

2009/0307660 A1* 12/2009 Srinivasan .............. G06F 8/314
717/114
2010/0269102 A1* 10/2010 Latorre ................. G06F 9/3851
717/130

FOREIGN PATENT DOCUMENTS

EP          3121714 A1     1/2017

OTHER PUBLICATIONS

K. Tai, "Definitions and Detection of Deadlock, Livelock, and Starvation in Concurrent Programs," 1994 Internatonal Conference on Parallel Processing vol. 2, North Carolina, USA, 1994, pp. 69-72, doi: 10.1109/ICPP.1994.84.

(Continued)

*Primary Examiner* — Michael J Metzger
(74) *Attorney, Agent, or Firm* — Brake Hughes Bellermann LLP

(57) ABSTRACT

Validation of correct derivation of a parallel program from a sequential program for deployment of the parallel program to a plurality of processing units is described. The system receives the program code of the sequential program and the program code of the parallel program. A static analysis component computes a first control flow graph, and determines dependencies within the sequential program code. It further computes a further control flow graph for each thread or process of the parallel program and determines dependencies within the further control flow graphs. A checking component checks if the sequential program and the derived parallel program are semantically equivalent by comparing the respective first and further control flow graphs and respective dependencies. A release component declares a correct derivation state for the parallel program to qualify the parallel program for deployment if the derived parallel program and the sequential program are semantically equivalent.

15 Claims, 7 Drawing Sheets

(56) References Cited

OTHER PUBLICATIONS

Chandan Karfa et al:, "A Quick Introduction to Functional Verification of Array-Intensive Programs," Mar. 22, 2019 (Mar. 22, 2019), pp. 2-8, Retrieved from the Internet: URL:https://www.researchgate.net/profile/Kunal_Banerjee/publication/333323732_A_Quick_Introduction_to_Functional_Verification_of_Array-Intensive_Programs/links/5ce6de4692851c4eabba1686/A-Quick-Introduction-to-Functional-Verification-of-Array-Intensive-Programs.pdf.
Kunal Banerjee el.: "Data-Race detection: the missing piece for an end-to-end semantic equivalence checker for parallelizing transformations of array-intensive programs", Libraries, Languages, and Compilers for Array Programming, ACM, Jun. 2, 2016, pp. 1-8.
Wikipedia: "Data dependency," available online at <https://en.wikipedia.org/w/index.php?title=Data_dependency&oldid=965953415>, Jul. 4, 2020, 5 pages.
J. Zhou: "Deadlock Analysis of Synchronous Message-Passing Programs," 1999 Proceedings International Symposium on Software Engineering for Parallel and Distributed Systems, Los Angeles, CA, USA, 1999, pp. 62-69, doi: 10.1109/PDSE.1999.779739.

* cited by examiner

COMPUTER SYSTEM AND METHOD FOR VALIDATION OF PARALLELIZED COMPUTER PROGRAMS

CROSS-REFERENCE TO RELATED APPLICATIONS

This application claims priority to, and is a continuation of, PCT/EP2021/068082, filed on Jun. 30, 2021 and entitled "Computer System and Method for Validation of Parallelized Computer Programs," which in turn claims priority to EP Appln. No. 20187124.1 filed on Jul. 22, 2020, both of which are hereby incorporated by reference in their entireties.

TECHNICAL FIELD

The present description generally relates to multi-processor systems, and more particularly, relates to methods, computer program products and systems for ensuring the correctness of parallelized computer programs before deployment.

BACKGROUND

The project leading to this application has received funding from the European Union's Horizon 2020 research and innovation programme under grant agreement No 879405.

Multi-processor systems are often used to speed up large computational tasks by splitting the tasks into subtasks, and assigning subtasks to processes or threads, which can be handled by different data processing units that are able to communicate and exchange data with each other. The different data processing units can then work in parallel on a (computational) task. The data processing units are often referred to as central processing units (CPUs), processors, physical (processor) cores, or virtual (processor) cores, where a single CPU may contain several physical and/or virtual cores. That is, a multi-processor system is a computer system which has two or more CPUs, physical and/or virtual cores to which different processes/threads can be assigned for parallel execution. In the following, such data processing units are also referred to as processors or simply processing units.

If a parallel program is to be executed on a multi-processor system, there may be different parts of the program that are assigned to different processing units. For example, the task of the program may be the sharpening of a large digital image, and different processing units of the multi-processor system may be assigned to perform this task for different sections of the digital image. The sharpening algorithm performed by a particular processing unit may require data from the environment of a particular pixel that is processed by a different processing unit. In other words, data which is falling into the section processed by one of the other processors may be needed by the particular processing unit. In such a case, there may be a write operation for a particular variable to be executed by a first processing unit and a read operation for the same particular variable to be executed by a second processing unit. The result is that data exchange within the parallel program is required between the first and second processors to enable the data flow (i.e., to transfer the data from the first to the second processor or vice versa). Parallelizer tools in general derive a parallel program from a sequential program. Thereby, they can use a plurality of methods to enable data exchange between the first and second processors with the goal that the parallelized program performs the same function as the sequential program from which it is derived.

For example, a parallelizer tool can:
(1) use separate memory locations for the variable and insert communication statements to transfer the variable, or
(2) use the same memory location for the variable within a shared memory and synchronize data access by synchronization statements, or
(3) use a combination of both methods.

However, a parallelizer tool may introduce errors into the generated parallel program such that the parallel program and the original sequential program are not semantically equivalent. Semantic equivalence as used herein means that—for the same input—the parallel and the sequential program always deliver the same result under all circumstances. If the two programs are not semantically equivalent, there is no guarantee that the parallel program delivers the same result as the original sequential program. Parallelizer tools are known in the art.

SUMMARY

There is therefore a need to ensure, before a parallel program is deployed for execution on a multi-core/processor system, that the parallel program delivers exactly the same result under all circumstances as the sequential program from which it was derived. In other words, the correctness of the parallelization needs to be checked to avoid parallelization errors during the parallel program execution on a multi-core/processor system, such as, for example, the occurrence of data race conditions, deadlocks, and the like.

In general, a computer program is a collection of instructions (or statements) that performs a specific task when executed by a computer. It is thereby irrelevant whether the computer program is available in a high-level language, such as C, in an assembler language, in binary code, in an intermediate representation within a compiler, or in any other representation known by a person skilled in the art. A sequential computer program is based on a single thread of execution (referred to as thread or process herein) that has one entry point. A parallel computer program is based on multiple threads or processes, with each thread/process having its own entry point and running independently.

Two threads/processes of a parallel computer program can communicate via messages over one or more channels. In this case, the receiver of a message must wait until the sender has sent a message. A channel has a limited capacity for storing messages. Similarly, if the channel is full (cannot hold more messages), the sender must wait until the receiver has retrieved a message from the channel.

Two threads/processes of a parallel computer program can synchronize their execution. In this case, one thread/process must wait until another thread/process fires a signal before continuing its execution. Two threads of a parallel computer program can access shared data in a shared memory. When one thread writes to a shared memory location, it is important to ensure that no other thread reads or writes to that same memory location at the same time. Otherwise, data race conditions may occur during execution. In general, a parallel program is adapted to use shared memory if two or more threads of the parallel program access the same memory location.

The technical problem of how to prevent deployment of a malfunctioning parallel program is solved by a computer system, a computer-implemented method and a computer program product as defined by the independent claims.

In one embodiment, a computer-implemented method is provided for validation of correct derivation of a parallel program from a sequential program. Thereby, the validation is performed prior to deployment of the parallel program to a plurality of processing units to prevent the deployment of a malfunctioning parallel program, which may cause failure of the system with the plurality of processing units. This is particularly relevant in application scenarios where the parallel program is deployed to a system component, which may execute system-critical functions of a product, such as an embedded system component. For example, an embedded system that controls a break function or an airbag function in a car needs to be robust and reliable. Furthermore, the functioning of such components using parallel programs is often time critical in that a quasi-real-time system response is expected. Hence, the computer-implemented method is evaluating the correctness of the parallel program in view of the original sequential program with the following steps.

A static analysis component computes a first control flow graph (CFG) from the (source) code of the sequential program. Static analysis components are well known in the art. The first CFG represents all paths that can be traversed through the execution of the sequential program. In general, a CFG in computer science is a representation, using graph notation, of all paths that might be traversed through a program during its execution. In a CFG, each node represents a basic block, i.e., a (straight-line) sequence of instructions or statements without any jumps or jump targets in between; jump targets start a block, and jumps end a block. Directed edges are used to represent jumps in the control flow or to connect consecutive blocks. There are, in most representations, two specially designated blocks: the entry block, through which control flow enters the flow graph, and the exit block, through which all control flow leaves.

Further, the static analysis component determines dependencies within the sequential program code. A dependency between two statements involves a first statement and a second statement that depends on (the result of) the first statement. In other words, the first statement must be executed before the second statement to preserve the intended behavior of the program. A particular dependency can be any of the following:
- a control dependency related to a condition under which a statement is executed if the previous statement evaluates in a way that allows its execution,
- a data dependency (or flow dependency) related to a variable which is written before being read (i.e. a particular statement depends on the result stored in a variable of a previous statement), and
- a memory dependency related to a memory location where the memory content is written before being read or re-written (i.e., a particular statement depends on the result stored in a memory location of a previous statement, or when the ordering of the statements affects the final value stored in the memory location).

The static analysis component further computes, from the code of the parallel program, a further CFG for each thread or process of the parallel program. The further CFGs represent all paths that can be traversed through the execution of the parallel program. Further, also within the parallel program code, dependencies (control, data and memory dependencies) are determined. For example, the static analysis component can identify a data dependency between a first statement in a first basic block and a second statement in a second basic block, where a data flow is required from a first processor to a second processor of the multi-processor system. Further, it can identify all paths between the first basic block and the second basic block in the CFG.

Once the CFG for the sequential program and the CFGs for the parallel program are derived, a checking component performs a check if the derived parallel program and the sequential program are semantically equivalent. To perform this check, the respective CFGs and the determined dependencies are compared. There are different ways to verify the semantic equivalence of two computer programs.

In one implementation, the checking component may perform the following steps:
checking that each statement in the parallel program corresponds to an identical statement in the sequential program, wherein a first statement in the sequential program (sequential statement) is identical to a second statement in the parallel program (parallel statement) if the first and second statements:
- have an identical instruction type (i.e., two statements having an identical instruction type perform the same calculations according to the same calculation rules, whereby the accessed data represented by variable names of the two statements can be different),
- have corresponding dependencies such that, for a dependency of the first statement on a further sequential statement, and a corresponding dependency of the second statement on a further parallel statement, the further sequential statement corresponds to the further parallel statement;

checking that the parallel program is free of data race conditions (which may cause undefined program behavior) by computing which basic blocks of the CFG of the parallel program can theoretically be executed at the same time, and by validating that, for each simultaneously executable basic block, each memory location (or variable) is only accessed by a particular thread while the particular thread is writing to the memory location (e.g., by modifying or writing to the variable);

checking that the parallel program is free of deadlocks by computing which basic blocks of the parallel program can theoretically be executed at the same time, and by validating that, for each simultaneously executable basic block, no circular wait between these basic blocks exist.

In an alternative implementation, checking that the parallel program is free of deadlocks is implemented by computing which basic blocks of the parallel program can theoretically be executed at the same time and the transition between the set of simultaneously executable basic blocks, and by validating that, for each set of simultaneously executable basic blocks comprising a communication or synchronization statement, a chain of transitions exists to a set of simultaneously executable basic blocks that do not comprise a communication or synchronization statement.

In one embodiment, checking a first and second instruction having the same instruction type is implemented by converting the first and second instruction into an unambiguous string representation, replacing the variable names in the string representations by "VAR" and comparing the resulting string of the first instruction with the resulting string of the second instruction for equivalence. For example, two instructions having the string representations "A[i+1]" and "B[x+1]". The resulting string is "VAR[VAR+1]" in both cases and therefore both instruction having the same instruction type.

In one embodiment, checking a first and second instruction having the same instruction type utilizes the commutative law for commutative operations such that e.g. "x=a+ 10" has the same instruction type as "x=10+a".

The checking component in this implementation determines that the derived parallel program and the sequential program are semantically equivalent if all three checks as described above deliver a positive result. A positive result implies that the first check proves identity of the program statements, the second check proves that no data race conditions exist, and the third check proves that no deadlocks occur.

In an alternative implementation, the checking component may perform the following steps:
  checking that output data of the sequential program and the parallel program are computed by identical statements, wherein two statements are identical if:
    both statements have an identical instruction type (i.e., perform the same calculation according to the same calculation rule as described above),
    both statements are executed under the same conditions,
    the input data of both statements are computed by identical statements or correspond to identical input data of the sequential program and the parallel program;
  checking that the parallel program is free of data race conditions;
  checking that the parallel program is free of deadlocks.

The checking component in this alternative implementation determines that the derived parallel program and the sequential program are semantically equivalent if all three checks of the alternative implementation deliver a positive result.

It is to be noted that some parallelizer tools guarantee the generation of parallel programs which are free of deadlocks and/or data race conditions. In such embodiments, the semantic equivalence of the sequential and derived parallel program can already be proven by the identity checking step (i.e., the first checking step) of the two alternative implementations. The checks for data race conditions and deadlocks are therefore optional checks which are only needed if the parallelizer tool cannot provide such guarantees, respectively.

If the checking component delivers a positive result, the derived parallel program and the sequential program are semantically equivalent, and a correct derivation state for the parallel program is finally declared/set, qualifying the parallel program for deployment to the plurality of processing units. A correct derivation state may be declared/set by setting a corresponding flag.

In one embodiment, the computer-implemented method includes a further step which is advantageous for computing the further CFGs in case the parallel program is adapted to use shared memory (i.e., the parallel program uses shared memory for data exchange when being executed by the plurality of processing units). In this embodiment, the static analysis component adds to the CFGs of the parallel program control flow edges representing instructions employed to synchronize control flow (synchronize execution) of multiple processing units. Examples of such instructions for synchronizing execution of the control flow across multiple processing units are: SEND and RECEIVE instructions, or SIGNAL and WAIT instructions.

In one embodiment, the computer-implemented method includes a further step which is advantageous for computing the further CFGs in case the parallel program comprises message-passing instructions for communication (SEND and RECEIVE instructions). In this embodiment, the message-passing instructions of the parallel program include message-receiving instructions and corresponding message-sending instructions. If a first instruction depends on the data received by a message-receiving instruction, and if the data sent by the corresponding message-sending instruction depends on a second instruction, the first instruction has an effective dependency on the second instruction. In other words, the first statement effectively operates on the data of the second statement. The static analysis component replaces any dependency of a first instruction on the data received by a message-receiving instruction by a dependency of the first instruction on the corresponding second instruction. In order to be able to assess the semantic equivalence, the real (effective) dependencies across the affected further CFGs need to be restored by such dependency replacements.

In some cases, the parallel program may be derived by a parallelizer tool which does not guarantee that generated synchronization instructions or communication instructions of the parallel program are correct in the sense that a synchronization instruction is correct if it actually synchronizes the control flow, and a communication instruction is correct if it exchanges data between threads of the parallel program.

A positive result of a corresponding check regarding the correctness of synchronization/communication instructions is a requirement for determining semantic equivalence of the parallel program and the sequential program. Such correct synchronization/communication instructions do not need to be taken into account anymore for the further processing and can simply be ignored. For example, they may be flagged as irrelevant.

In one implementation, such irrelevant statements may be flagged or removed from the further CFGs with a further step which may be advantageous for computing the further CFGs. For example, the synchronization instructions of the parallel program may include RECEIVE/RECV and corresponding SEND instructions and/or SIGNAL and corresponding WAIT instructions. If parameters of corresponding synchronization instructions are correct in that they synchronize the control flow of the parallel program and in case of communication instructions (message-passing instructions) communicating data, the static analysis component may flag/remove each corresponding synchronization instruction from the further CFGs. That is, synchronization instructions of the parallel program which have no equivalent instructions in the sequential program are therefore flagged as irrelevant or are completely removed. Parameters of corresponding synchronization instructions are correct in that they synchronize the control flow of the parallel program and in case of message-passing instructions communicating data if, for example:
  ID of sending process/thread parameter corresponds to process/thread ID of the process/thread including the respective SEND or SIGNAL instruction;
  ID of receiving process/thread parameter corresponds to process/thread ID of the process/thread including the respective RECEIVE or WAIT instruction;
  Parameter representing the size of transferred data of corresponding instructions are identical;
  Parameter representing the size of transferred data corresponds to the size of the transferred or received variable/data; and
  Communication ID parameter of corresponding synchronization instructions are identical.

If parameters of corresponding synchronization instructions are not correct in that they do not synchronize the control flow of the parallel program, and in case of message-passing instructions not communicating data, the corresponding synchronization instructions are not flagged/removed, and the identity checking step fails because the synchronization instructions of the parallel program have no corresponding instructions in the sequential program.

In one embodiment, a computer program product is provided that, when loaded into a memory of a computing device and executed by at least one processor of the computing device, executes the steps of the computer-implemented method as disclosed herein.

In one embodiment, a computer system is provided for validation of correct derivation of a parallel program from a sequential program for deployment of the parallel program to a plurality of processing units. The computer system has a memory and one or more processors, which allows the system to load and execute said computer program product. In other words, the computer system implements components/modules, which can perform the steps of the computer-implemented method described herein. The computer system can be seen as a parallel program validator, which compares the sequential program and the parallel program for semantic equivalence to determine the correctness of the derived parallel program before it is finally deployed to a multi-processor/multi-core system.

Further aspects of the description will be realized and attained by means of the elements and combinations particularly depicted in the appended claims. It is to be understood that both the foregoing general description and the following detailed description are exemplary and explanatory only and are not restrictive.

DETAILED DESCRIPTION

Figure 1:
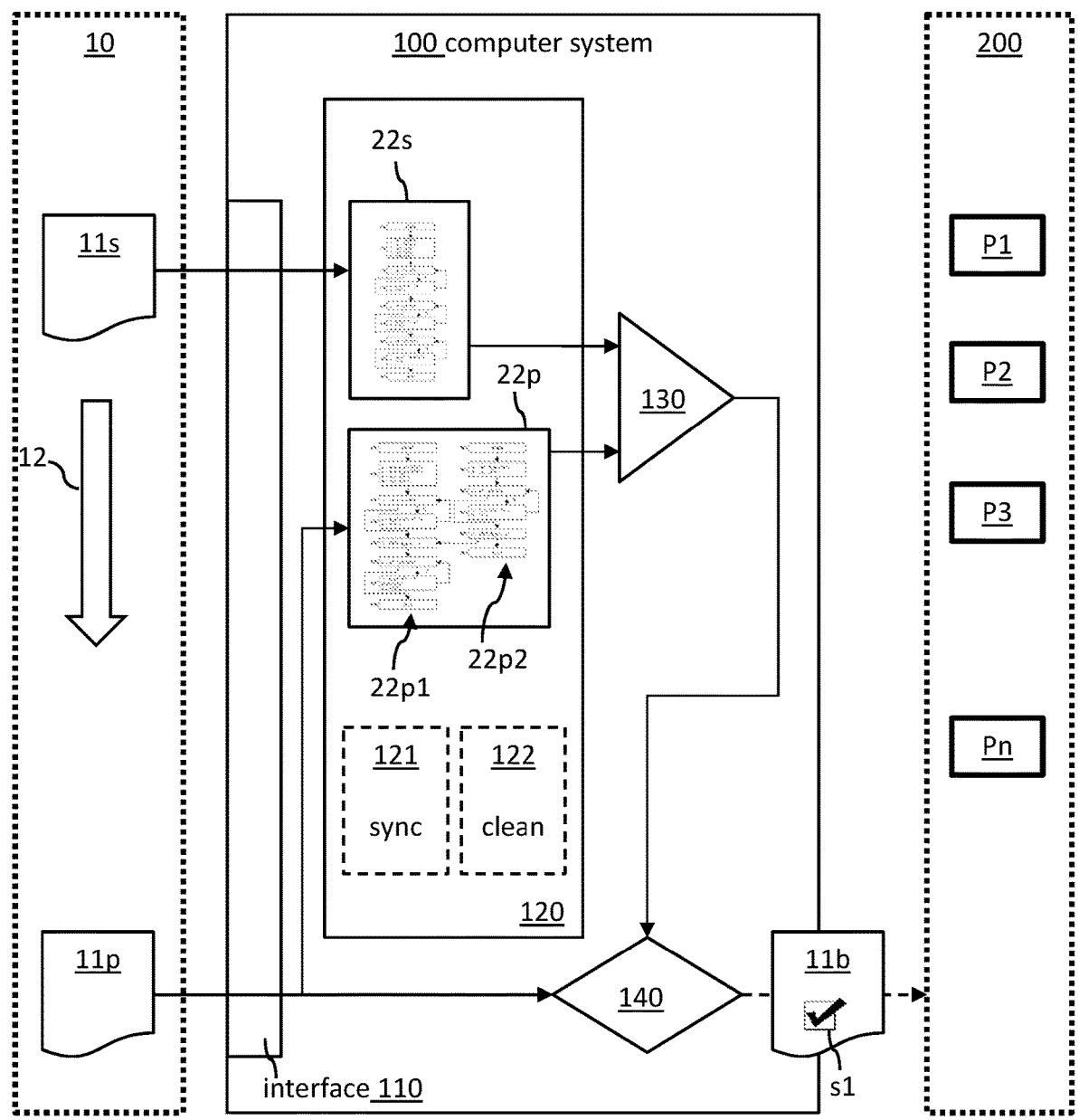
FIG. 1 is a simplified block diagram with a computer system for validation of correct derivation of a parallel program according to an embodiment of the description before deployment of the parallel program to a plurality of processing units.
Figure 2:
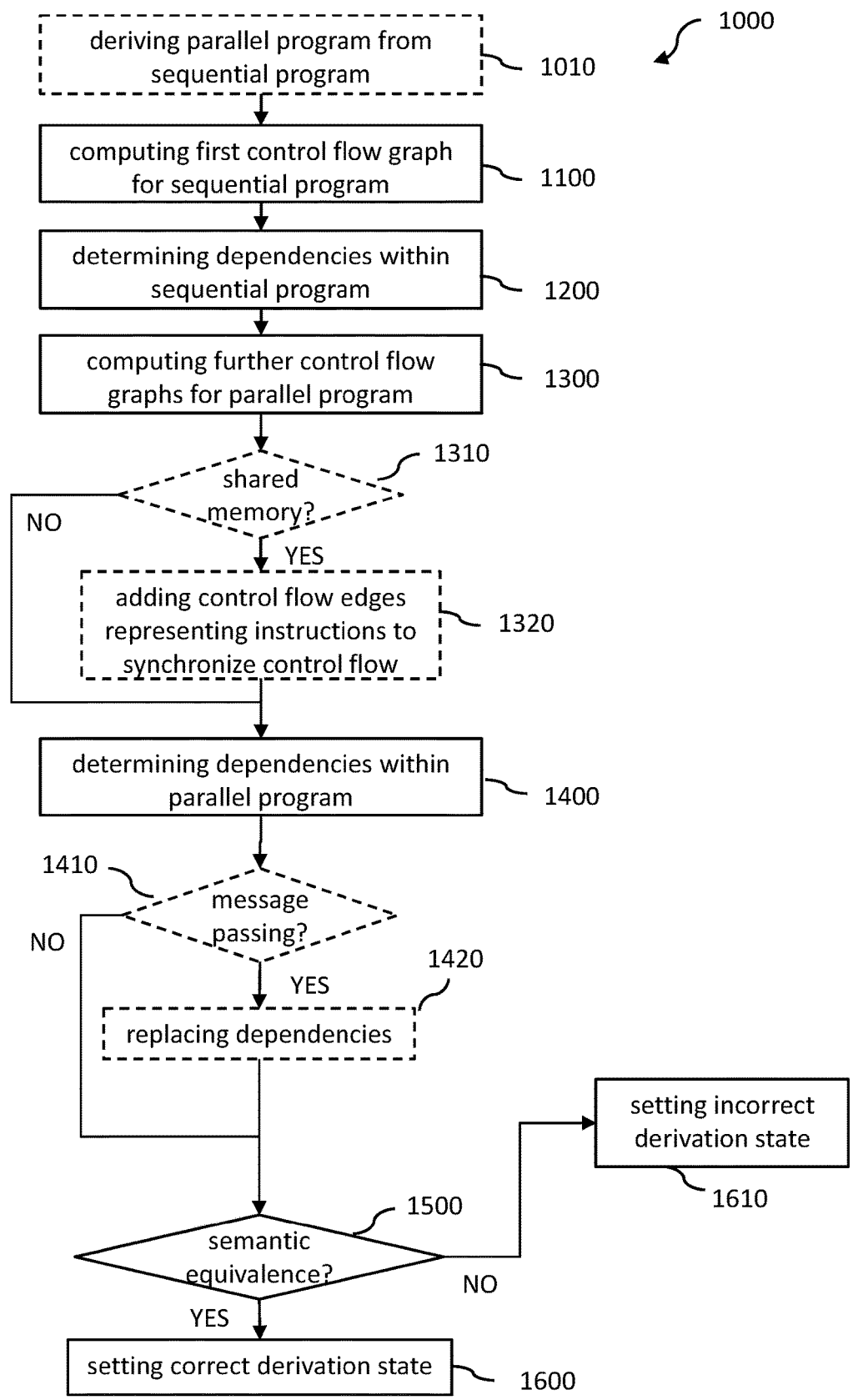
FIG. 2 is a simplified flowchart of a computer-implemented method for validation of correct derivation of a parallel program from a sequential program for deployment of the parallel program to a plurality of processing units according to an embodiment of the description.

FIG. 1 is a simplified block diagram of a computer system 100 for validation of correct derivation 12 of a parallel program 11$p$ from a sequential program 11$s$ for deployment of the parallel program 11$p$ to a plurality 200 of processing units P1 to Pn. Deployment of the parallel program to the plurality of processing units is to be understood as deploying certain parts of the parallel program to respective processing units for parallel execution. The function of the computer system 100 is discussed in the context of the simplified flowchart of the computer-implemented method 1000 as depicted in FIG. 2. The method 1000 for validation of correct derivation of the parallel program from the sequential program for deployment of the parallel program to the plurality of processing units may be executed by the computer system 100. Therefore, the following description relates to reference numbers of FIG. 1 and FIG. 2.

Deriving 1010 the parallel program 11$p$ from the sequential program 11$s$ is performed by a parallelizer tool 10 (as described earlier) prior to the validation procedure. The parallelizer tool 10 can be a separate tool operated on a separate computer system. In this case, the computer system 100 is communicatively coupled with the parallelizer tool 10 via an appropriate interface 110 to receive the program code of the sequential program 11$s$ and the program code of the parallel program 11$p$. Optionally, the parallelizer tool may be implemented as an integral component of the computer system 100, in which case the interface 110 corresponds to an internal communication interface within the system 100.

The program code of the sequential and parallel programs can be in any programming language that is appropriate to be subject to a static analysis. Program code can be subject to static analysis if it is possible to extract, at compile time, the control flow and the control, data and memory dependencies from the program code. Examples for program code which can be subject to static analysis include: assembly languages, intermediate languages (i.e. LLVM IR) and imperative programming languages (i.e. Ada, C, C++, Java, MATLAB). In these languages, statements or instructions are used to change the state of a program.

The system 100 further has a static analysis component 120 to compute 1100, from the code of the sequential program 11$s$, a first control flow graph 22$s$ representing all paths that can be traversed through the execution of the sequential program 11$s$. Available tools, such as for example LLVM (provided by the LLVM Compiler Infrastructure, available at www.llvm.org) or GCC (the GNU Compiler Collection, available at https://gcc.gnu.org/), can be used for performing the static analysis of the respective program code. Further, the static analysis component 120 determines 1200 dependencies within the sequential program code. In general, dependencies of three different types can be present in a program. A particular dependency can be a control dependency related to a condition under which a program statement is executed, a data dependency related to a variable which is written before being read, or a memory dependency related to a memory location where the memory content has changed. The different dependency types are discussed in more detail in the example programs described in the context of FIGS. 3A, 3B.

Further, the static analysis component 120 computes 1300, from the code of the parallel program 11$p$, a further control flow graph 22$p$1, 22$p$2 for each thread or process of the parallel program. The further control flow graphs 22$p$ represent all paths that can be traversed through the execution of the parallel program 11$p$. Within the further control flow graphs 22$p$, the static analysis component 120 also determines 1400 existing dependencies of any of the three dependency types.

The static analysis component 120 may have optional modules 121, 122 to perform further operations on the generated CFGs 22$p$1, 22$p$2 of the parallel program 11$p$. The optional module 121 can perform a check 1320 to determine if the parallel program is adapted to use shared memory. If this is the case, module 121 adds 1320 respective control flow edges to the further CFGs, wherein the further control flow edges represent instructions employed to synchronize execution of the multiple processing units P1 to Pn. Details are described in the context of FIG. 3B.

The optional module 122 can perform a check 1410 if the parallel program 11p uses message passing for communication. If this is the case, module 122 replaces 1420 any dependencies on removed message-receiving instructions by corresponding effective dependencies. The function of the optional module 122 is described in more detail in FIGS. 4A, 4B.

A checking component 130 of the system 100 checks 1500 if the sequential program 11s and the derived parallel program 11p are semantically equivalent by comparing the respective first control flow graph 22s with the further control flow graphs 22s, 22p, and by comparing the respective dependencies.

In one implementation, checking 1500 the semantic equivalence of the sequential and parallel programs includes:
a) checking that each relevant statement in the parallel program corresponds to an identical statement in the sequential program, wherein a relevant statement in the parallel program is any statement which is not only employed to synchronize control flow or exchange data, and wherein a first statement in the sequential program is identical to a second statement in the parallel program if the first and second statements:
  have an identical instruction type (i.e., perform the same calculation),
  have corresponding dependencies such that, for a dependency of the first statement on a third statement (in the sequential program), and a corresponding dependency of the second statement on a fourth statement (in the parallel program), the third statement corresponds to the fourth statement;
b) optionally checking that the parallel program is free of data race conditions by computing which basic blocks in the control flow of the parallel program can theoretically be executed at the same time, and by validating that, for each basic block which is simultaneously executable with another basic block, each variable is only accessed by a particular thread while the particular thread is modifying the variable;
c) optionally checking that the parallel program is free of deadlocks by computing which basic blocks of the parallel program can theoretically be executed at the same time, and by validating that, for each simultaneously executable basic block, no circular wait between these basic blocks exists;
d) optionally checking that generated synchronization instructions or communication instructions—if present in the parallel program—are correct in that each synchronization instruction of the parallel program synchronizes the control flow of the parallel program, and each communication instruction of the parallel program exchanges data between threads of the parallel program; and
e) determining that the derived parallel program and the sequential program are semantically equivalent if all checks deliver a positive result.

In an alternative implementation, checking 1500 the semantic equivalence of the sequential and parallel programs includes:
i. checking that output data of the sequential program and the parallel program are computed by identical instructions, wherein two instructions are identical if:
  both instructions have an identical instruction type (i.e., perform the same calculation),
  both instructions are executed under the same conditions,
  the input data of both instructions are computed by identical instructions or correspond to identical input data of the sequential program and the parallel program.
ii. optionally checking that the parallel program is free of data race conditions;
iii. optionally checking that the parallel program is free of deadlocks;
iv. optionally checking that generated synchronization instructions or communication instructions—if present in the parallel program—are correct; and
v. determining that the derived parallel program and the sequential program are semantically equivalent if all checks deliver a positive result.

If the checking component 130 concludes, as a result of the check 1500, that the derived parallel program 11p and the sequential program 11s are semantically equivalent, a release component 140 of the system 100 declares 1600 (i.e., sets) a correct derivation state s1 for the parallel program 11p, to qualify the parallel program 11p for deployment to the plurality 200 of processing units P1 to Pn. Otherwise, an incorrect derivation state is set 1610 to prevent deployment of the faulty parallel program.

Figure 3A:
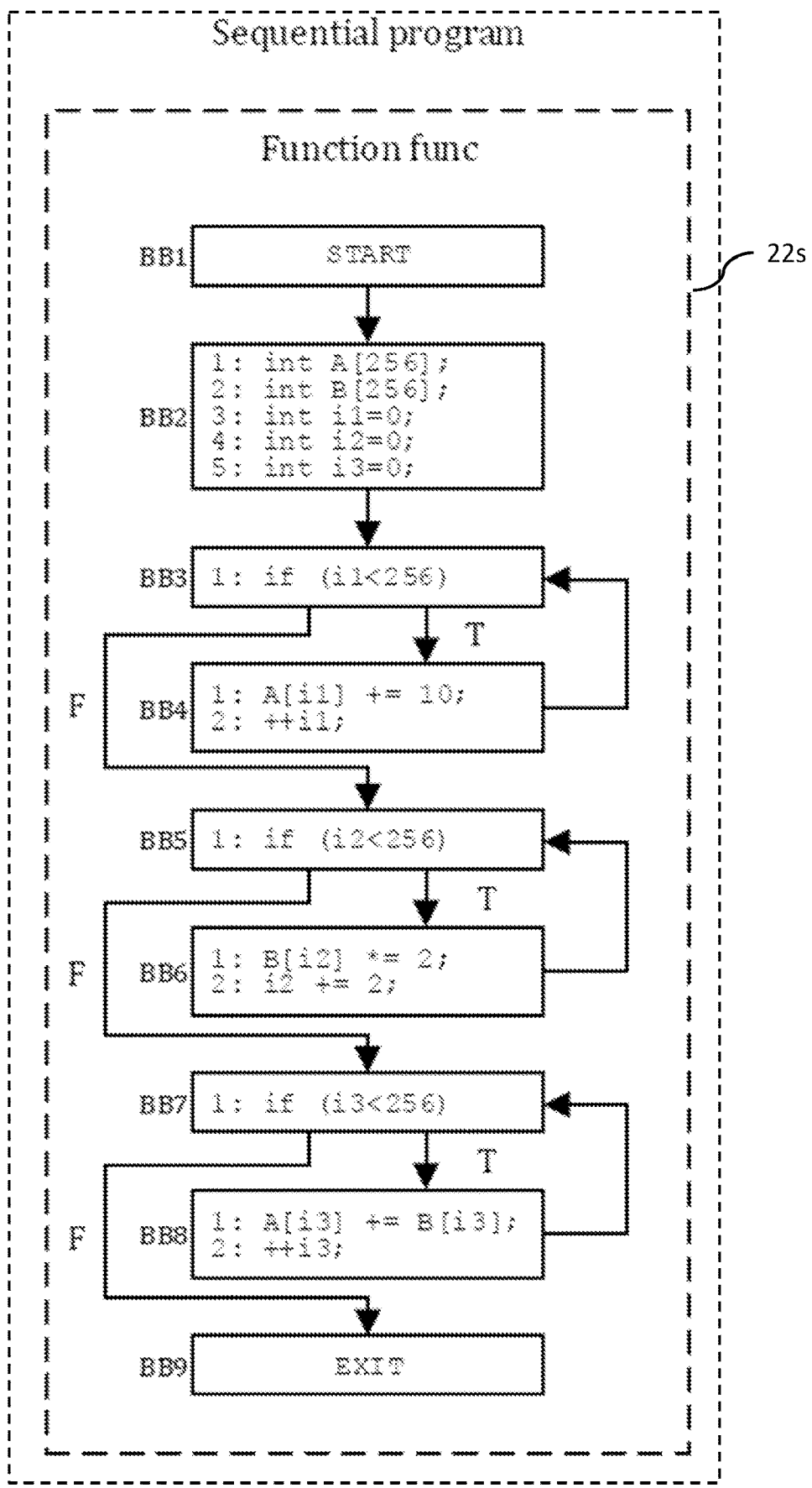
FIG. 3A is an example of a computed control flow graph of a sequential program.

FIG. 3A is an example of a computed control flow graph 22s of the following sequential program example. The example code (in the programming language C) of the sequential program is:

```
void func(int A[256], int B[256]) {
    int i1=0;
    int i2=0;
    int i3=0;
    while (i1<256) {
        A[i1] += 10;
        ++i1;
    }
    while (i2<256) {
        B[i2] *= 2;
        i2 += 2;
    }
    while (i3<256) {
        A[i3] += B[i3];
        ++i3;
    }
}
```

The function "func" of the sequential program receives two integer arrays A and B. In a first loop (first while statement), the value "10" is added to each component of the array A. In a second loop (second while statement), every second component of the array B is multiplied by the value "2". In a third loop (third while statement), for each component of the array A, the value of the corresponding component of the array B is added.

FIG. 3A illustrates the CFG 22s which is constructed from the above example code of the sequential program by the static analyzer. CFG 22s is structured by so-called basic blocks (BB*), which represent corresponding parts of the program. The entry point of CFG 22s is the "START" condition in BB1. BB2 represents the initialization of the arrays A and B and the loop counters i1, i2, i3.

BB3 and BB4 represent the first loop. Thereby, BB3 includes the loop condition. As long as i1<256 the path transitions (T) to BB4 where the loop instructions are executed for the current loop counter value. The loop counter i1 is then incremented and the path transitions back to BB3 until the loop condition is not fulfilled any more (i.e. i1=256). At this point, the path transitions from BB3 to BB5. BB5 represents the loop condition of the second loop (BB5 and BB6). BB6 represents the loop instructions of the second loop. Again, once the loop condition is no longer met, the path transitions from BB5 to BB7. BB7 and BB8 represent the third loop in the same manner as it is the case for the first and second loops.

Finally, the CFG 22s ends with BB9 representing the "EXIT" condition for the sequential program.

Figure 3B:
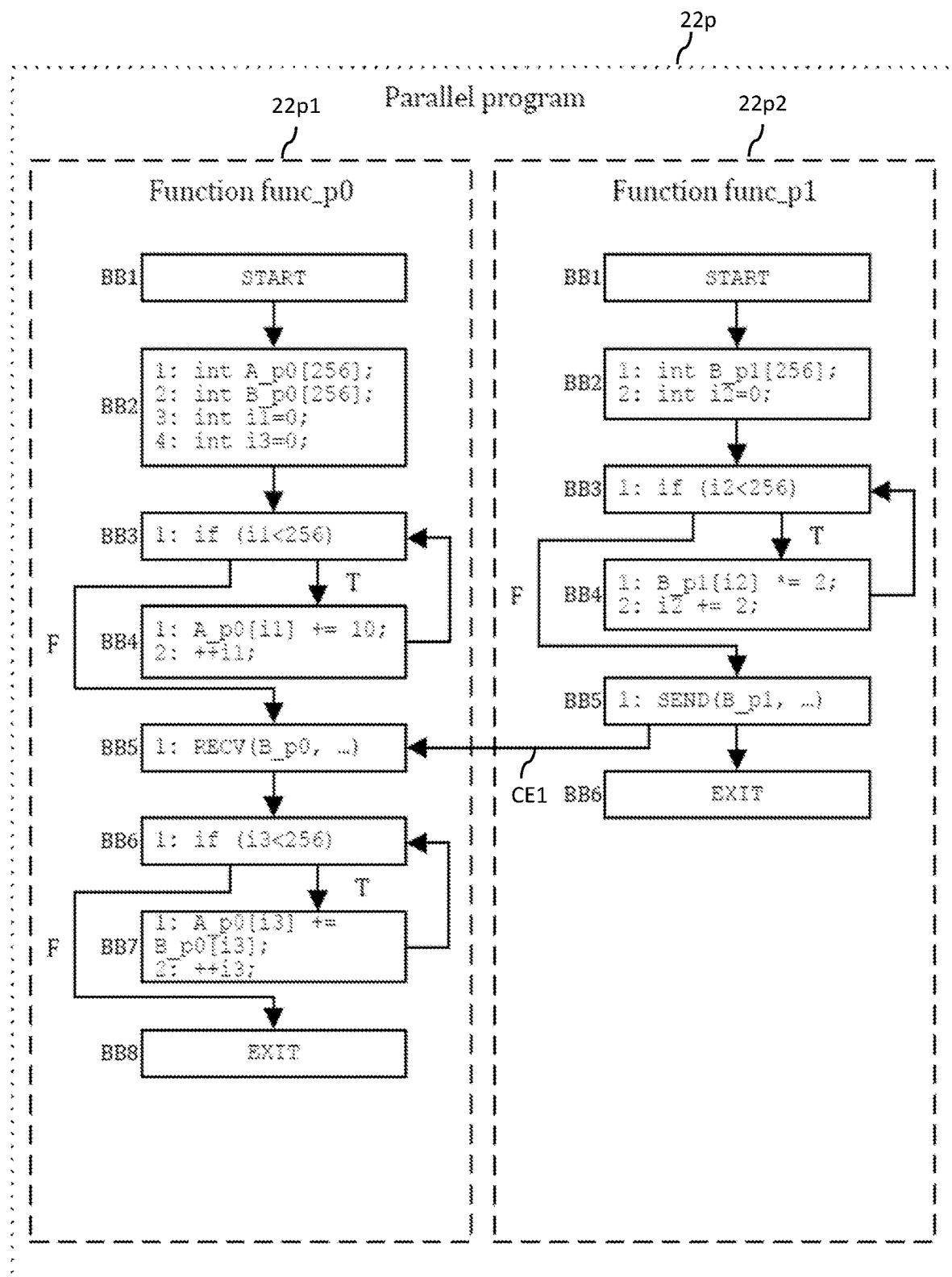
FIG. 3B is an example of two computed control flow graphs for two threads of a parallel program, which was derived from the sequential program.

FIG. 3B is an example of further computed control flow graphs 22p1, 22p2 of the following parallel program example, which was derived from the above sequential program code by an appropriate parallelizer tool. The example code (in the programming language C) of the parallel program is:

```
void func_p0(int A_p0[256]) {
    int i1=0;
    int i3=0;
    int B_p0[256];
    while (i1<256) {
        A_p0[i1] += 10;
        ++i1;
    }
    RECV(B_p0, sizeof(B_p0), 0, 1, 123);
    while (i3<256) {
        A_p0[i3] += B_p0[i3];
        ++i3;
    }
}
void func_p1(int B_p1[256]) {
    int i2=0;
    while (i2<256) {
        B_p1[i2] *= 2;
        i2 += 2;
    }
    SEND(B_p1, sizeof(B_p1), 1, 0, 123);
}
```

The function "func" of the sequential program has been split up by the parallelizer in two functions "func_p0" and "func_p1", with func_p0 to be executed on processing unit p0, and func_p1 to be executed on processing unit p1. Function func_p0 implements the first and third loops of the sequential program, whereas function func_p1 implements the second loop of the sequential program. The initialization of the corresponding arrays A_p0 and B_p1 now occurs in the respective functions func_p0 and func_p1 of the parallel program.

When the two functions of the parallel program are executed in parallel, the second loop of func_p0 requires as an input the result of the loop processed by function func_p1 (the array B_p1). For this reason, the parallelizer has inserted corresponding send and receive statements "SEND" and "RECV". That is, once func_p1 has computed the multiplication result for B_p1, B_p1 is transferred to func_p0 via the respective send and receive statements. Only when B_p1 has been received by func_p0, the execution of the second loop of func_p0 will deliver the desired and correct result for A_p0.

The static analyzer generates from the above parallel program the CFGs 22p of the parallel program. In FIG. 3B CFG 22p1 represents the control flow of function func_p0 and CFG 22p2 represents the control flow of function func_p1. Besides the basic blocks for start and exit and the basic blocks representing the respective loops, the static analyzer has created additional basic blocks representing the communication statements SEND (BB5 of 22p2) and RECV (BB5 of func_p0). Further, the static analyzer has generated additional edge CE1 representing the control flow between the basic blocks for the communication statements. That is, the plurality 22p of all CFGs of the parallel program with edges representing the control flow with regard to communication statements in the parallel program reflect the entire control flow with all traversable paths in the parallel program.

Once the CFGs of the sequential and parallel programs have been generated, the static analyzer continues to determine the dependencies in the respective programs. The following tables Table 1, Table 2a and Table 2b show the determined dependencies of all three dependency types with the first column showing the identifiers of the various objects in the respective CFG (Object ID), the second column showing the corresponding type (Type) of the respective object, the third column showing control dependencies (Ctrl Dependencies) for the respective object, and the fourth and fifth columns showing Data Dependencies and Memory Dependencies where existing.

TABLE 1 dependencies sequential program

| Object ID | Type | Ctrl Dependencies | Data Dependencies | Memory Dependencies |
|---|---|---|---|---|
| Func | FUNC | | | |
| func.BB1 | BB | Func | | |
| func.BB2 | BB | Func | | |
| func.BB3 | BB | Func | | |
| | | func.BB3.1 (T) | | |
| func.BB4 | BB | func.BB3.1 (T) | | |
| func.BB5 | BB | Func | | |
| | | func.BB5.1 (T) | | |
| func.BB6 | BB | func.BB5.1 (T) | | |
| func.BB7 | BB | Func | | |
| | | func.BB7.1 (T) | | |
| func.BB8 | BB | func.BB7.1 (T) | | |
| func.BB9 | BB | Func | | |
| func.BB2.1 | int VAR[256]; | func.BB2 | | |
| func.BB2.2 | int VAR[256]; | func.BB2 | | |
| func.BB2.3 | int VAR = 0; | func.BB2 | | |
| func.BB2.4 | int VAR = 0; | func.BB2 | | |
| func.BB2.5 | int VAR = 0; | func.BB2 | | |
| func.BB3.1 | if (VAR < 256) | func.BB3 | func.BB2.3 (i1) | |
| | | | func.BB4.2 (i1) | |

TABLE 1-continued dependencies sequential program

| Object ID | Type | Ctrl Dependencies | Data Dependencies | Memory Dependencies |
|---|---|---|---|---|
| func.BB4.1 | VAR [VAR] += 10; | func.BB4 | func.BB2.1 (A) func.BB2.3 (i1) func.BB4.2 (i1) | func.BB2.1 (*A) func.BB4.1 (*A) |
| func.BB4.2 | ++VAR; | func.BB4 | func.BB2.3 (i1) func.BB4.2 (i1) | |
| func.BB5.1 | if (VAR < 256) | func.BB5 | func.BB2.4 (i2) func.BB6.2 (i2) | |
| func.BB6.1 | VAR [VAR] *= 2; | func.BB6 | func.BB2.2 (B) func.BB2.4 (i2) func.BB6.2 (i2) | func.BB2.2 (*B) func.BB6 |
| func.BB6.2 | VAR += 2; | func.BB6 | func.BB2.4 (i2) func.BB6.2 (i2) | |
| func.BB7.1 | if (VAR < 256) | func.BB7 | func.BB2.5 (i3) func.BB8.2 (i3) | |
| func.BB8.1 | VAR [VAR] += VAR [VAR]; | func.BB8 | func.BB2.1 (A) func.BB2.2 (B) func.BB2.5 (i3) func.BB8.2 (i3) | func.BB4.1 (*A) func.BB8.1 (*A) func.BB6.1 (*B) |
| func.BB8.2 | ++VAR; | func.BB8 | func.BB2.5 (i3) func.BB8.2 (i3) | |

The Object IDs in the dependency tables are structured in the following manner: function.basic_block.statement_number, with "." used as separator. That is, the first part indicates the function name in which the object occurs, the second part the basic block and the third part the position of the respective statement in said basic block.

The following description refers to particular example objects to explain dependencies for different object types and different dependency types. A person skilled in the art is able to transfer the described dependency concepts to another Object ID listed in said tables. The first Object ID in Table 1 is the function func of the sequential program, which is of type FUNC and has no dependencies. The following Object IDs func.BB1 to func.BB9 are of the type BB (basic block). All basic blocks (e.g. func.BB1) have one or more control dependencies. Some basic blocks (func.BB1, func.BB2, func.BB9) have exactly one control dependency on the function itself. That is, the basic blocks are only executed if the function func is executed. Some basic blocks have exactly one control dependency on a statement in a basic block. For example, func.BB4 has a control dependency on the "if" statement func.BB3.1. In other words, func.BB4 is only executed when the "if" statement func.BB3.1 has the result "TRUE". Some basic blocks have a plurality of control dependencies. That is, the basic blocks are executed if one of the referred objects is executed. For example, func.BB3 has two control dependencies—one on function func and one on the "if" statement func.BB3.1. In other words, basic block BB4 is executed when the function func is executed or the "if" statement func.BB3.1 has the result "TRUE". A person skilled in the art may calculate the control dependencies by constructing the post-dominance frontier of the CFG, and then reversing it to obtain a control dependence graph.

The remaining Object IDs in Table 1 (func.BB2.1 to func.BB8.2) relate to statements which operate on variables of the sequential program in that values are assigned to such variables, or in that values of such variables are evaluated. Of course, each of such statements is only executed when the respective basic block object is executed. Therefore, all those Object IDs have a control dependency on the basic block in which the respective statement is included.

In addition, such value assignment statements have data dependencies (with the exception of mere value initialization statements func.BB2.1 to func.BB2.5). For example, the "if" statement in func.BB3.1 checks if the variable i1<256. Of course, this statement depends on the initialization Object ID of i1 in func.BB2.3 (i1), but also depends on the incrementation of i1 in func.BB4.2 (i1).

The addition of "10" to the array component A(i1) in func.BB4.1 depends on the initialization and incrementation of i1 in the respective statements func.BB2.3 (i1) and func.BB4.2 (i1), and depends on the initialization of A in statement func.BB2.1 (A).

Statements which manipulate the arrays A and B may also have memory dependencies in that they refer to a memory location where the memory content has changed. For example, the addition of "10" to the array component A(i1) in func.BB4.1 depends on the values in the respective array component as initialized in func.BB2.1 (*A), and, of course, also depends on the value written to the respective array component in the statement func.BB4.1 (*A) itself. In basic block BB8 the values of the corresponding array components of A and B are added. This implies memory dependencies on the value assignment statements func.BB4.1 (*A), func.BB8.1 (*A), and func.BB6.1 (*B).

Table 2a shows the determined dependencies from CFG 22p1 of FIG. 3B for the function func_p0 of the parallel program, and Table 2b shows the determined dependencies from CFG 22p2 for the function func_p1 of the parallel program. The determined dependencies follow the same pattern as the dependencies in the sequential program. Therefore, only the basic blocks representing the communication instructions SEND and RECV, as well as Object IDs with memory dependencies will be discussed in more detail.

TABLE 2a dependencies parallel program func_p0

| Object ID | Type | Ctrl Dependencies | Data Dependencies | Memory Dependencies |
|---|---|---|---|---|
| func_p0 | FUNC | | | |
| func_p0.BB1 | BB | func_p0 | | |
| func_p0.BB2 | BB | func_p0 | | |
| func_p0.BB3 | BB | func_p0 | | |
| func_p0.BB4 | BB | func_p0.BB3.1 (T) | | |
| func_p0.BB5 | BB | func_p0.BB3.1 (T) | | |
| func_p0.BB6 | BB | func_p0 | | |
| func_p0.BB7 | BB | func_p0.BB6.1 (T) | | |
| func_p0.BB8 | BB | func_p0.BB6.1 (T) | | |
| func_p0.BB8 | BB | func_p0 | | |
| func_p0.BB2.1 | int VAR[256]; | func_p0.BB2 | | |
| func_p0.BB2.2 | int VAR[256]; | func_p0.BB2 | | |
| func_p0.BB2.3 | int VAR = 0; | func_p0.BB2 | | |
| func_p0.BB2.4 | int VAR = 0; | func_p0.BB2 | | |
| func_p0.BB3.1 | if (VAR < 256) | func_p0.BB3 | func_p0.BB2.3 (i1) func_p0.BB4.2 (i1) | |
| func_p0.BB4.1 | VAR[VAR] += 10; | func_p0.BB4 | func_p0.BB2.1 (A_p0) func_p0.BB2.3 (i1) func_p0.BB4.2 (i1) | func_p0.BB2.1 (*A_p0) func_p0.BB4.1 (*A_p0) |
| func_p0.BB4.2 | ++VAR; | func_p0.BB4 | func_p0.BB2.3 (i1) func_p0.BB4.2 (i1) | |
| func_p0.BB5.1 | RECV(B_p0, . . . ) | func_p0.BB5 | func_p0.BB2.2 (B_p0) | |
| func_p0.BB6.1 | if (VAR < 256) | func_p0.BB6 | func_p0.BB2.3 (i3) func_p0.BB7.2 (i3) | |
| func_p0.BB7.1 | VAR[VAR] += VAR[VAR]; | func_p0.BB7 | func_p0.BB2.1 (A_p0) func_p0.BB2.2 (B_p0) func_p0.BB2.3 (i3) func_p0.BB7.2 (i3) | func_p0.BB5.1 (*B_p0) func_p0.BB7.1 (*B_p0) |
| func_p0.BB7.2 | ++VAR; | func_p0.BB7 | func_p0.BB2.3 (i3) func_p0.BB7.2 (i3) | |

In FIG. 3B, basic block BB5 of func_p0 receives the values of array B from the corresponding basic block BB5 of func_p1. The respective control flow is illustrated by the edge CE1. The dependencies for the corresponding Object ID func_p0.BB5.1 (RECV statement) are a control dependency on the respective basic block func_p0.BB5 itself and a data dependency on the initialization statement func_p0.BB2.2 (B_p0) in function func_p0.

In addition, the statement associated with Object ID func_p0.BB7.1 for adding values of the corresponding array components of A and B has a memory dependence on func_p0.BB5.1 (*B_p0) representing the memory locations where such values have been stored after having been received from func_p1.

The "SEND" statement in BB5 of CFG 22p2 is reflected by Object ID func_p1.BB5.1 in Table 2b having a control dependency func_p1.BB5 on its respective basic block BB5. Furthermore, it has a data dependency func_p1.BB2.1 (B_p1), where B is initialized on the processing unit p1, and it has a memory dependency func_p1.BB4.1 (*B_p1) on the first loop instruction of BB4 in CFG 22p2, where the initial values of the array B components are multiplied by "2".

TABLE 2b dependencies parallel program func_p1

| Object ID | Type | Ctrl Dependencies | Data Dependencies | Memory Dependencies |
|---|---|---|---|---|
| func_p1 | FUNC | | | |
| func_p1.BB1 | BB | func_p1 | | |
| func_p1.BB2 | BB | func_p1 | | |
| func_p1.BB3 | BB | func_p1 | | |
| func_p1.BB4 | BB | func_p1.BB3.1 (T) | | |
| func_p1.BB5 | BB | func_p1.BB3.1 (T) | | |
| func_p1.BB6 | BB | func_p1 | | |
| func_p1.BB2.1 | int VAR[256]; | func_p1.BB2 | | |
| func_p1.BB2.2 | int VAR = 0; | func_p1.BB2 | | |
| func_p1.BB3.1 | if (VAR < 256) | func_p1.BB3 | func_p1.BB2.2 (i2) func_p1.BB4.2 (i2) | |

TABLE 2b-continued dependencies parallel program func_p1

| Object ID | Type | Ctrl Dependencies | Data Dependencies | Memory Dependencies |
|---|---|---|---|---|
| func_p1.BB4.1 | VAR[VAR] *= 2; | func_p1.BB4 | func_p1.BB2.1 (B_p1) func_p1.BB2.2 (i2) func_p1.BB4.2 (i2) | func_p1.BB2.1 (*B_p1) func_p1.BB4.1 (*B_p1) |
| func_p1.BB4.2 | VAR += 2; | func_p1.BB4 | func_p1.BB2.2 (i2) func_p1.BB4.2 (i2) | |
| func_p1.BB5.1 | SEND(B_p1, ...) | func_p1.BB5 | func_p1.BB2.1 (B_p1) | func_p1.BB4.1 (*B_p1) |

Table 3 illustrates for the above example, how the respective dependencies from message passing communication instructions "SEND" and "RECV" are replaced. The message passing communication instructions "SEND" and "RECV" are not used for the semantic equivalence check as illustrated in Table 5, e.g., by being flagged as irrelevant statements or even being removed from the CFGs 22p. The message-sending and message-receiving instructions are to be ignored for the semantic equivalence check because such instructions have no corresponding counterparts in the sequential program, and therefore the check would necessarily fail with such instructions. However, when simply ignoring or removing the "SEND" and "RECV" instructions from the parallel program and the respective CFGs 22p2 and 22p1, the corresponding dependencies would be lost and the check would again fail when comparing the dependencies of the parallel and sequential programs. Therefore, any dependency in CFG 22p1 which points to the ignored/removed "RECV" instruction in BB5 is now replaced by the corresponding dependencies of the ignored/removed "SEND" instruction in BB5 of CFG 22p2. This replacement re-establishes the original dependencies within the parallel program which would exist with such communication instructions. Therefore, after such ignore/remove-and-replace actions, the parallel program becomes again comparable to the sequential program for the purpose of checking the semantic equivalence.

Table 3 illustrates the consequences of the ignore/remove-and-replace steps with regard to basic block BB7 of CGF 22p1, where the values of the received array B are added to the corresponding current values of array A. In column "Data Dependencies Old", the data dependencies for func_p0.BB7.1 are listed prior to ignoring/removing of the message-receiving instruction. The data dependency func_p0.BB2.2 (B_p0) refers to the initialization of array B in func_p0. In column "Memory Dependencies Old", the memory dependencies for func_p0.BB7.1 are listed prior to the ignoring/removing of the message-receiving instruction. The memory dependency func_p0.BB5.1 (*B_p0) refers to the memory locations, where the values of array B are stored on p0 when the array is received from func_p1.

Such dependencies are not valid anymore once the "RECV" instruction has been ignored or removed from func_p0. Therefore, the respective old dependencies (highlighted in bold italics fonts in Table 3) are now replaced with the highlighted new dependencies as illustrated in the columns "Data Dependencies New" and "Memory Dependencies New" in Table 3.

TABLE 3 dependency changes

| Object ID | Data Dependencies Old | Data Dependencies New | Memory Dependencies Old | Memory Dependencies New |
|---|---|---|---|---|
| func_p0.BB7.1 | func_p0.BB2.1 (A_p0) *func_p0.BB2.2 (B_p0)* func_p0.BB2.3 (i3) func_p0.BB7.2 (i3) | func_p0.BB2.1 (A_p0) *func_p1.BB2.1 (B_p1)* func_p0.BB2.3 (i3) func_p0.BB7.2 (i3) | *func_p0.BB5.1 (*B_p0)* func_p0.BB7.1 (*B_p0) | *func_p1.BB4.1 (*B_p1)* func_p0.BB7.1 (*B_p0) |

The old data dependency func_p0.BB5.1 (*B_p0) on the "RECV" instruction in func_p0 is replaced by the data dependency func_p1.BB2.1 (B_p1) on the initialization instruction in BB2 of func_p1, which exists for the corresponding "SEND" instruction in func_p1. Only this dependency is relevant for BB7 of func_p0 because the relevant values of the components of array B are exclusively computed by func_p1 on processing unit p1. The same is true for values of array B components, which serve as input for the computation performed by BB7 of func_p0. They are exclusively determined by the computation performed in BB4 of func_p1. Therefore, the old memory dependency func_p0.BB5.1 (*B_p0) is replaced by the new memory dependency func_p1.BB4.1 (*B_p1) of the "SEND" instruction on the computation instruction in BB4 of func_p1.

When the checking component 130 (cf. FIG. 1) now performs the semantic equivalence check, the new dependencies in the parallel program after the removal or ignoring of the communication instructions correspond to the respective dependencies in the sequential program. In more detail, the dependencies of BB8 of func (which corresponds to BB7 of func_p0) in relation to array B refer to BB2 of func (data dependency func.BB2.2 (B) on the initialization statement corresponding to new data dependency func_p1.BB2.1 (B_p1) on the respective initialization statement in func_p1), and refer to BB6 of func (memory dependency func.BB6.1 (*B) on the computation statement for the component values of array B, which corresponds to a new memory dependency func_p1.BB4.1 (*B_p1) on the respective computation statement in func_p1).

As a result, the checking component finds for each statement in the derived parallel program an identical statement in the sequential program and concludes that the two programs are semantically equivalent if for each object in the parallel program (parallel object) a corresponding object in the sequential program is determined (sequential object). In other words, a parallel object maps to a sequential object if the following mapping conditions are fulfilled:
the types of the objects are identical, and
an object mapping exists between the control, data and memory dependencies of the parallel and sequential objects.

An iterative algorithm can be used to calculate the (object) mapping from parallel to sequential objects, where the algorithm adds new object mappings based on already mapped objects. In other words, in the iteration phase, the algorithm continues to add new object mappings based on already established mappings until no new mappings are found. An initialization phase provides a starting set of object mappings. Table 4 gives an example of the initial object mappings for the program above. A start condition for the algorithm is provided by an initialization. An initialization example with initialization values for the above parallel-sequential program example is given in Table 4.

TABLE 4

| | Initialization | | |
|---|---|---|---|
| Sequential object | C code | Parallel object | C code |
| Func | | func_p0 | |
| Func | | func_p1 | |

TABLE 4-continued

| | Initialization | | |
|---|---|---|---|
| Sequential object | C code | Parallel object | C code |
| func.BB2.1 | int A[256] | func_p0.BB2.1 | int A_p0[256] |
| func.BB2.2 | int B[256] | func_p0.BB2.2 | int B_p0[256] |
| func.BB2.2 | int B[256] | func_p1.BB2.1 | int B_p0[256] |

Thereby, a mapping is inserted between the parallel and sequential functions with the same name. Further, a mapping is inserted between function parameters with the same name.

For the functioning of the algorithm it may be advantageous to eliminate cyclic dependencies by performing additional pre- and post-processing steps around the iterative algorithm. In the pre-processing step, dependencies causing cycles are marked as "ignore". The algorithm then ignores such marked dependencies. As a consequence of ignoring cyclic dependencies, the algorithm may detect false-positive object mappings. Such false-positive object mappings are then removed in the post-processing step, which reinserts all dependencies previously marked as "ignore". Thereby, every potential object mapping is checked against the mapping conditions and removed in case the check fails (i.e., if it does not pass the check with the above mapping conditions.)

To eliminate cyclic dependencies, a generic graph algorithm can be applied. In general, the existence of a cycle in directed and undirected graphs can be determined using the well-known depth-first search (DFS). There is a cycle in a graph only if there is a so-called back edge present in the graph. In general, a back edge is an edge from a node to itself (self-loop) or to one of its ancestors in a tree (produced by DFS). In other words, if DFS finds an edge that points to an ancestor of the current vertex (the graph contains a back edge), this back edge is marked as "ignore". Eventually, all back edges are marked as "ignore". All back edges discovered by DFS are marked as "ignore" during pre-processing.

Table 5 shows the result of the pre-processing step by listing all dependencies that are marked as "ignore" in bold italics.

TABLE 5

| | | pre-processing | | |
|---|---|---|---|---|
| Object ID | Type | Ctrl Dependencies | Data Dependencies | Memory Dependencies |
| func_p1 | FUNC | | | |
| func_p1.BB1 | BB | func_p1 | | |
| func_p1.BB2 | BB | func_p1 | | |
| func_p1.BB2.1 | int VAR[256]; | func_p1.BB2 | | |
| func_p1.BB2.2 | int VAR = 0; | func_p1.BB2 | | |
| func_p1.BB3 | BB | func_p1 | | |
| | | *func_p1.BB3.1 (T)* | | |
| func_p1.BB3.1 | if (VAR < 256) | func_p1.BB3 | func_p1.BB2.2 (i2) | |
| | | | *func_p1.BB4.2 (i2)* | |
| func_p1.BB4 | BB | func_p1.BB3.1 (T) | | |
| func_p1.BB4.1 | VAR[VAR] *= 2; | func_p1.BB4 | func_p1.BB2.1 (B_p1) | func_p1.BB2.1 (*B_p1) |
| | | | func_p1.BB2.2 (i2) | *func_p1.BB4.1 (*B_p1)* |
| | | | *func_p1.BB4.2 (i2)* | |
| func_p1.BB4.2 | VAR += 2; | func_p1.BB4 | func_p1.BB2.2 (i2) | |
| | | | *func_p1.BB4.2 (i2)* | |
| func_p1.BB5 | BB | func_p1 | | |
| func_p1.BB6 | BB | func_p1 | | |
| func_p0 | FUNC | | | |
| func_p0.BB1 | BB | func_p0 | | |
| func_p0.BB2 | BB | func_p0 | | |

TABLE 5-continued pre-processing

| Object ID | Type | Ctrl Dependencies | Data Dependencies | Memory Dependencies |
|---|---|---|---|---|
| func_p0.BB2.1 | int VAR[256]; | func_p0.BB2 | | |
| func_p0.BB2.2 | int VAR[256]; | func_p0.BB2 | | |
| func_p0.BB2.3 | int VAR = 0; | func_p0.BB2 | | |
| func_p0.BB2.4 | int VAR = 0; | func_p0.BB2 | | |
| func_p0.BB3 | BB | func_p0 *func_p0.BB3.1 (T)* | | |
| func_p0.BB3.1 | if (VAR < 256) | func_p0.BB3 | func_p0.BB2.3 (i1) *func_p0.BB4.2 (i1)* | |
| func_p0.BB4 | BB | func_p0.BB3.1 (T) | | |
| func_p0.BB4.1 | VAR[VAR] += 10; | func_p0.BB4 | func_p0.BB2.1 (A_p0) func_p0.BB2.3 (i1) *func_p0.BB4.2 (i1)* | func_p0.BB2.1 (*A_p0) *func_p0.BB4.1 (*A_p0)* |
| func_p0.BB4.2 | ++VAR; | func_p0.BB4 | func_p0.BB2.3 (i1) *func_p0.BB4.2 (i1)* | |
| func_p0.BB5 | BB | func_p0 | | |
| func_p0.BB6 | BB | func_p0 *func_p0.BB6.1 (T)* | | |
| func_p0.BB6.1 | if (VAR < 256) | func_p0.BB6 | func_p0.BB2.4 (i3) *func_p0.BB7.2 (i3)* | |
| func_p0.BB7 | BB | func_p0.BB6.1 (T) | | |
| func_p0.BB7.1 | VAR[VAR] += VAR[VAR]; | func_p0.BB7 | func_p0.BB2.1 (A_p0) func_p1.BB2.1 (B_p1) func_p0.BB2.4 (i3) *func_p0.BB7.2 (i3)* | func_p1.BB4.1 (*B_p1) *func_p0.BB7.1 (*B_p0)* |
| func_p0.BB7.2 | ++VAR; | func_p0.BB7 | func_p0.BB2.4 (i3) *func_p0.BB7.2 (i3)* | |
| func_p0.BB8 | BB | func_p0 | | |

The iterative object mapping algorithm then searches through the list of parallel objects to find corresponding sequential objects. Thereby, dependencies marked as "ignore" are ignored.

The resulting corresponding objects for the example are shown in Table 6.

TABLE 6 object mapping

| Parallel object | Type | Sequential object |
|---|---|---|
| func_p0 | FUNC | Func |
| func_p1 | FUNC | Func |
| func_p0.BB2.1 | int VAR[256]; | func.BB2.1 |
| func_p0.BB2.2 | int VAR[256]; | func.BB2.2 |
| func_p1.BB2.1 | int VAR[256]; | func.BB2.2 |
| func_p1.BB1 | BB | func.BB1, func.BB2, func.BB9 |
| func_p1.BB2 | BB | func.BB1, func.BB2, func.BB9 |
| func_p1.BB2.2 | int VAR = 0; | func.BB2.3, func.BB2.4, func.BB2.5 |
| func_p1.BB3 | BB | func.BB3, func.BB5, func.BB7 |
| func_p1.BB3.1 | if (VAR < 256) | func.BB3.1, func.BB5.1, func.BB7.1 |
| func_p1.BB4 | BB | func.BB4, func.BB6, func.BB8 |
| func_p1.BB4.1 | VAR[VAR] *= 2; | func.BB6.1 |
| func_p1.BB4.2 | VAR += 2; | func.BB6.2 |
| func_p1.BB5 | BB | func.BB1, func.BB2, func.BB9 |
| func_p1.BB6 | BB | func.BB1, func.BB2, func.BB9 |
| func_p0.BB1 | BB | func.BB1, func.BB2, func.BB9 |
| func_p0.BB2 | BB | func.BB1, func.BB2, func.BB9 |
| func_p0.BB2.3 | int VAR = 0; | func.BB2.3, func.BB2.4, func.BB2.5 |
| func_p0.BB2.4 | int VAR = 0; | func.BB2.3, func.BB2.4, func.BB2.5 |
| func_p0.BB3 | BB | func.BB3, func.BB5, func.BB7 |
| func_p0.BB3.1 | if (VAR < 256) | func.BB3.1, func.BB5.1, func.BB7.1 |
| func_p0.BB4 | BB | func.BB4, func.BB6, func.BB8 |
| func_p0.BB4.1 | VAR[VAR] += 10; | func.BB4.1 |
| func_p0.BB4.2 | ++VAR; | func.BB4.2, func.BB6.2, func.BB8.2 |
| func_p0.BB5 | BB | func.BB1, func.BB2, func.BB9 |
| func_p0.BB6 | BB | func.BB3, func.BB5, func.BB7 |

TABLE 6-continued object mapping

| Parallel object | Type | Sequential object |
|---|---|---|
| func_p0.BB6.1 | if (VAR < 256) | func.BB3.1, func.BB5.1, func.BB7.1 |
| func_p0.BB7 | BB | func.BB4, func.BB6, func.BB8 |
| func_p0.BB7.1 | VAR[VAR] += VAR[VAR]; | func.BB8.1 |
| func_p0.BB7.2 | ++VAR; | func.BB4.2, func.BB6.2, func.BB8.2 |
| func_p0.BB8 | BB | func.BB1, func.BB2, func.BB9 |

The object mappings in the first five rows (between parallel objects and corresponding sequential objects) of Table 6 are derived from the initialization list. Some of the following rows of Table 6 will be explained in detail, and a skilled person will then be able to understand the entire mapping table.

Basic block func_p1.BB1 has one control dependency on func_p1 (cf. Table 2b). func_p1 corresponds to func. The three sequential basic blocks func.BB1, func.BB2 and func.BB9 have a control dependency on func. Therefore, func_p1.BB1 corresponds to func.BB1, func.BB2 and func.BB9.

The same reasoning applies to func_p1.BB2, func_p1.BB5, func_p1.BB6, func_p0.BB1, func_p0.BB2, func_p0.BB5, func_p0.BB8

Statement func_p1.BB2.2 is of type "int VAR=0;" and has one control dependency on func_p1.BB2 (cf. Table 2b). func_p1.BB2 corresponds to func.BB1, func.BB2, func.BB9. The three sequential statements func.BB2.3, func.BB2.4 and func.BB2.5 correspond to func_p1.BB2.2 because they have the same type and a control dependency on func.BB2.

The same reasoning applies to func_p0.BB2.3 and func_p0.BB2.4

Basic block func_p1.BB3 has two control dependencies, one on func_p1 and the other on func_p1.BB3.1. func_p1 corresponds to func and func_p1.BB3.1 is ignored. The three sequential basic blocks func.BB3, func.BB5 and func.BB7 have two control dependencies, with the first dependency being on func. Therefore, func_p1.BB3 corresponds to blocks func.BB3, func.BB5 and func.BB7.

The same reasoning applies to func_p0.BB3 and func_p0.BB6.

Statement func_p1.BB3.1 is of type "if (VAR<256)" and has one control dependency on func_p1.BB3 and two data dependencies on func_p1.BB2.2 and func_p1.BB4.2 (cf. Table 2b). func_p1.BB3 corresponds to func.BB3, func.BB5 and func.BB7. func_p1.BB2.2 corresponds to func.BB2.3, func.BB2.4 and func.BB2.5. func_p1.BB3 is ignored. The three sequential statements func.BB3.1, func.BB5.1 and func.BB7.1 correspond to func_p1.BB3.1 because they have the same type and a control dependency on func.BB2.

The same reasoning applies to func_p0.BB3.1 and func_p0.BB6.1.

Basic block func_p1.BB4 has one control dependency on func_p1.BB3.1. func_p1.BB3.1 corresponds to func.BB3.1, func.BB5.1 and func.BB7.1. The three sequential basic blocks func.BB4, func.BB6 and func.BB8 have one control dependency on func.BB3.1, func.BB5.1 and func.BB7.1, respectively. Therefore, func_p1.BB3 corresponds to blocks func.BB4, func.BB6 and func.BB8.

The same reasoning applies to func_p0.BB4, func_p0.BB7.

In a post-processing step, false-positive object mappings are removed. False-positive objects mappings may be found by the iterative matching algorithm since dependencies that are marked as "ignore" are ignored. In a removing false-positives step, all corresponding objects are checked in order to consider all dependencies. Any corresponding objects are removed where the check with all dependencies fails. The removing false-positives step is repeated until no more corresponding objects are to be removed.

In the above example, the matching algorithm found that statement func_p1.BB3.1 corresponds to func.BB3.1, func.BB5.1, and func.BB7.1. Thereby, the data dependency to func_p1.BB4.2 was ignored during calculation. In the removing false-positives step, the object mapping of statement func_p1.BB3.1 is checked considering the dependency to func_p1.BB4.2. The statement func_p1.BB4.2 corresponds to func.BB6.2. Only func.BB5.1 has a control dependency to func.BB6.2. The statements func.BB3.1 and func.BB7.1 do not have such a control dependency. The object mapping of statement func_p1.BB3.1 is correct and corresponds to func.BB5.1.

The above result of the checking component allows the release component 140 (cf. FIG. 1) to provide the derived parallel program for deployment to the plurality 200 of processing units as semantic equivalence was proven.

The following example illustrates a situation where semantic equivalence cannot be confirmed and the respective parallel program is not released for deployment. It is assumed that the parallel program is derived from the same sequential program as in FIG. 3A, but the parallelizer has introduced an error during parallelization. In the function func_p1 of FIG. 3B, the statement "B_p1[i2] *=2;" was erroneously replaced by the statement "B_p1[i2] *=3;" as illustrated in the following erroneous (faulty) code example:

```
void func_p1(int B_p1[256]) {
  int i2=0;
  while (i2<256) {
    B_p1[i2] *= 3;
    ++i2;
  }
  SEND(B_p1, sizeof(B_p1), 1, 0, 123);
}
```

The CFG of the above faulty code example substantially corresponds to CFG 22p2 of FIG. 3B, with the exception that statement func_p1.BB4.1 differs ("B_p1[i2] *=3;").

The calculated dependency table used as input to the matching algorithm of the faulty code example substantially corresponds to the dependency table Table 2b, with the exception that the type of statement func_p1.BB4.1 is "VAR[VAR] *=3;" instead of "VAR[VAR] *=2";

The result of the matching algorithm for the faulty code example substantially corresponds to the result of the matching algorithm for the example in FIG. 3B, with the exception that no matching sequential object can be found for the parallel object func_p1.BB4.1 (cf. Table 7).

TABLE 7 object mapping for faulty code example

| Parallel object | Type | Sequential object |
|---|---|---|
| func_p1.BB4.1 | VAR[VAR] *= 3 | |

Therefore, the derived faulty parallel program and the original sequential program are not considered to be semantically equivalent since no sequential object for func_p1.BB4.1 can be identified in the sequential program.

Figure 4A:
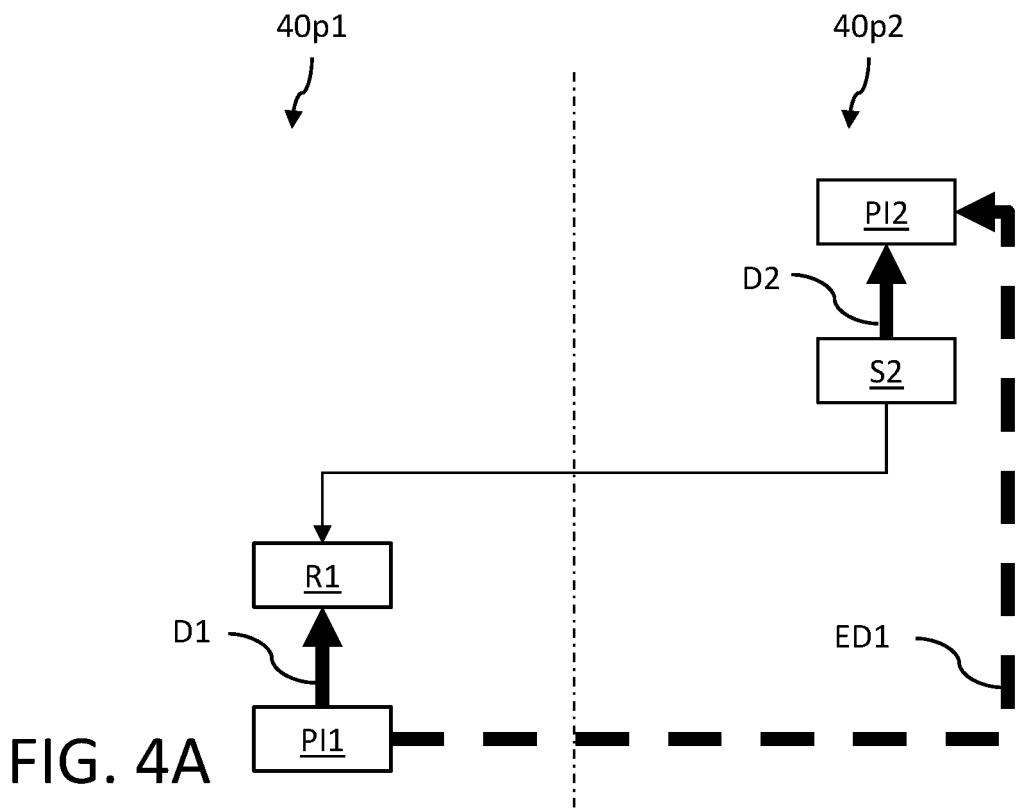
FIGS. 4A, 4B show an example embodiment where dependencies on message-passing instructions are replaced by effective dependencies.

FIG. 4A illustrates an embodiment where the parallel program represented by the two CFGs 40p1, 40p2 uses message passing for communication. In the example, the message-passing instructions include message-receiving instruction R1 and corresponding message-sending instruction S2. Of course, in a real parallel program, typically a plurality of message-receiving and message-sending instructions are present. In the example, a first parallelized instruction P11 has an effective dependency ED1 on a second parallelized instruction P12 because the first parallelized instruction P11 depends D1 on the message-receiving instruction R1 and the corresponding message-sending instruction S2 depends D2 on the second parallelized instruction P12. The optional module 122 (cf. FIG. 1) of this embodiment concludes that the parallel program uses message passing for communication.

Figure 4B:
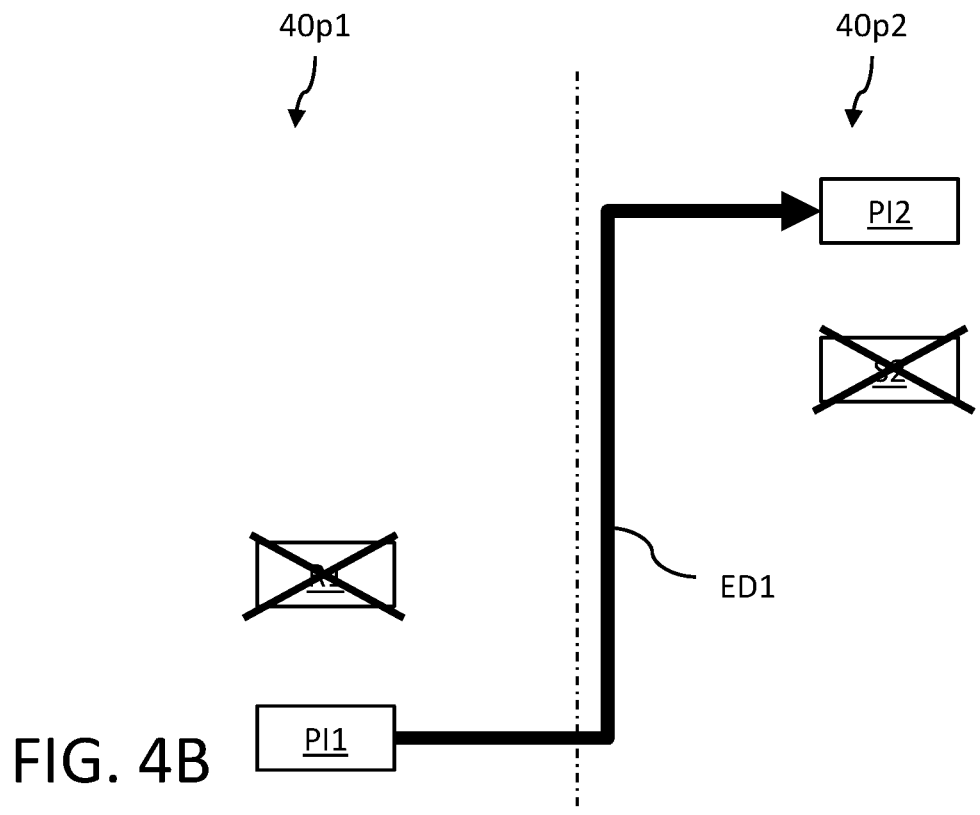

FIG. 4B illustrates the result of actions performed by the optional module 122 after having performed the check if the parallel program uses message passing for communication. Module 122 has removed each message-passing instruction R1, S2 (crossed out) from the further control flow graphs 40p1, 40p2, and has replaced any dependencies on removed message-receiving instructions (cf. D1, D2 in FIG. 4A) by the corresponding effective dependency ED1. In case that the parallel program also includes SIGNAL/WAIT instructions, such instructions are removed from the further control flow graphs without any replacement of dependencies as there is no transfer of variables between threads of the parallel program in this case which would imply such dependencies.

For detecting data race conditions and deadlocks, a reachability analysis of parallel program states is performed.

Thereby, a deadlock is a situation in which two computer programs sharing the same resource are effectively preventing each other from accessing the resource, resulting in both programs failing to function. The result of the reachability analysis is a reachability graph, which is a directed graph containing the parallel program states and their transitions. The reachability graph contains, among other things, the information which basic blocks can theoretically be executed at the same time (i.e., execution at the same time is possible and, therefore, cannot be excluded). The techniques of reachability analysis are known by the skilled person.

K

In one embodiment, a parallel program state may be defined by:
   a) the currently executed basic block of each thread,
   b) active signals or sends for communication and synchronization statements, and
   c) branch constraints per basic block.

The reachability analysis can be performed by an iterative algorithm. The algorithm has a set of theoretically possible states (represented by the reachability graph). The set is initialized with the entry basic blocks of the parallel program. For each parallel program state within the set, all possible next states are determined and added to the set as long as no further states can be found.

For detecting deadlocks, it is important that the execution count during the reachability analysis of pairs of synchronization and communication statements are equivalent. The execution count of said statements depends on control flow dependencies. The control flow dependencies of each pair of synchronization and communication statements is analyzed and the containing basic blocks are marked as "interlocked".

The possible next states are determined by moving each thread to its possible next basic block according to the CFG. Without loss of generality, it is assumed that only one thread changes its basic block at the same time. Thereby, the following constraints are applied that prevent a thread to move forward:

i. A basic block with a WAIT or RECV statement can only be executed if its signal or send ID is within the active signals or sends (executed send statements).
  ii. A basic block with a SEND or SIGNAL statement can only be executed if its signal or send ID is NOT within the active signals or sends.
  iii. A thread and basic block with branch constraint can only follow the CFG edge according to the branch constraint.

A thread with a state is identified as blocking if a communication statement (SEND or RECV) or synchronization statement (WAIT or SIGNAL) prevents the thread from moving forward (constraint i. or ii.).

During execution of a basic block, the state is modified according to the following rules:
  a. A basic block with a WAIT or RECV statement removes the signal or send ID from the active signals or sends.
  b. A basic block with a SEND or SIGNAL statement adds the signal or send ID of the statement to the active signals or sends.
  c. A basic block with a branch constraint removes the branch constraint.
  d. A basic block with a branch constraint that is interlocked with another basic block adds a branch constraint to the interlocked basic block.

Figure 5:
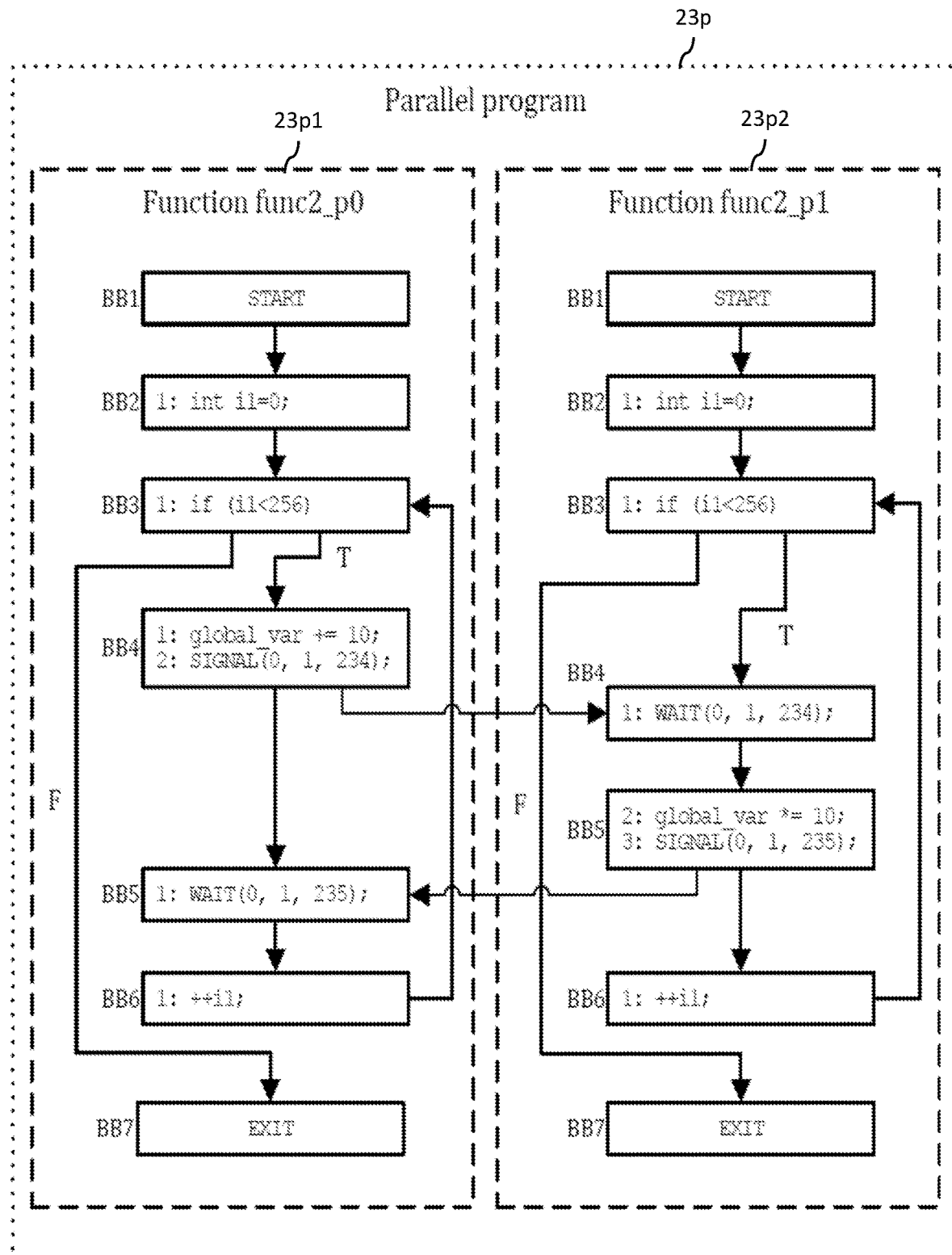
FIG. 5 is a further example of two computed control flow graphs for two threads of a parallel program, which was derived from the sequential program.

FIG. 5 illustrates a parallel program 23$p$ example with CFGs 23$p$1, 23$p$2 derived from a respective sequential program. This example is based on shared memory (unlike the previous examples, which relied on message passing).

For example, the func2_p0.BB4.2 (SIGNAL) and func2_p1.13134.1 (WAIT) statements share the same communication identifier. They have a control dependency to statement func2_p0.BB3.1 and func2_p1.13133.1, respectively. The containing basic blocks func2_p0.BB3 and func2_p1.13133 are marked as interlocked.

Table 8 contains all determined parallel program states for the shared memory example as well as their transitions (next states). The entries in the columns "Thread 1 State" and "Thread 2 State" are printed in bold italics if a thread is blocked in the respective state.

TABLE 8 thread states

| # | Thread 1 State | Thread 2 State | Active Signals (/Sends) | Branch Constraints | Next States |
|---|---|---|---|---|---|
| #1 | func2_p0.BB1 | func2_p1.BB1 | | | #2, #3 |
| #2 | func2_p0.BB2 | func2_p1.BB1 | | | #4, #5 |
| #3 | func2_p0.BB1 | func2_p1.BB2 | | | #5, #6 |
| #4 | func2_p0.BB3 | func2_p1.BB1 | | | #7, #8, #9 |
| #5 | func2_p0.BB2 | func2_p1.BB2 | | | #9, #10 |
| #6 | func2_p0.BB1 | func2_p1.BB3 | | | #10, #11, #12 |
| #7 | func2_p0.BB4 | func2_p1.BB1 | | func2_p1.BB3: T | #13, #14 |
| #8 | func2_p0.BB7 | func2_p1.BB1 | | func2_p1.BB3: F | #15 |
| #9 | func2_p0.BB3 | func2_p1.BB2 | | | #14, #15, #16 |
| #10 | func2_p0.BB2 | func2_p1.BB3 | | | #16, #17, #18 |
| #11 | func2_p0.BB1 | *func2_p1.BB4* | | func2_p0.BB3: T | #17 |
| #12 | func2_p0.BB1 | func2_p1.BB7 | | func2_p0.BB3: F | #18 |
| #13 | *func2_p0.BB5* | func2_p1.BB1 | 234 | func2_p1.BB3: T | #19 |
| #14 | func2_p0.BB4 | func2_p1.BB2 | | func2_p1.BB3: T | #19, #20 |
| #15 | func2_p0.BB7 | func2_p1.BB2 | | func2_p1.BB3: F | #21 |
| #16 | func2_p0.BB3 | func2_p1.BB3 | | | #20, #21, #22, #23 |
| #17 | func2_p0.BB2 | *func2_p1.BB4* | | func2_p0.BB3: T | #22 |
| #18 | func2_p0.BB2 | func2_p1.BB7 | | func2_p0.BB3: F | #23 |
| #19 | *func2_p0.BB5* | func2_p1.BB2 | 234 | func2_p1.BB3: T | #24 |
| #20 | func2_p0.BB4 | func2_p1.BB3 | | func2_p1.BB3: T | #24, #25 |
| #21 | func2_p0.BB7 | func2_p1.BB3 | | func2_p1.BB3: F | #26 |
| #22 | func2_p0.BB3 | *func2_p1.BB4* | | func2_p0.BB3: T | #25 |
| #23 | func2_p0.BB3 | func2_p1.BB7 | | func2_p0.BB3: F | #26 |
| #24 | *func2_p0.BB5* | func2_p1.BB3 | 234 | func2_p1.BB3: T | #27 |

TABLE 8-continued thread states

| # | Thread 1 State | Thread 2 State | Active Signals (/Sends) | Branch Constraints | Next States |
|---|---|---|---|---|---|
| #25 | func2_p0.BB4 | *func2_p1.BB4* | | | #27 |
| #26 | func2_p0.BB7 | func2_p1.BB7 | | | |
| #27 | *func2_p0.BB5* | func2_p1.BB4 | 234 | | #28 |
| #28 | *func2_p0.BB5* | func2_p1.BB5 | | | #29 |
| #29 | func2_p0.BB5 | func2_p1.BB6 | 235 | | #30, #31 |
| #30 | func2_p0.BB6 | func2_p1.BB6 | | | #32, #33 |
| #31 | func2_p0.BB5 | func2_p1.BB3 | 235 | | #33, #34, #35 |
| #32 | func2_p0.BB3 | func2_p1.BB6 | | | #36, #37, #16 |
| #33 | func2_p0.BB6 | func2_p1.BB3 | | | #16, #38, #39 |
| #34 | func2_p0.BB5 | *func2_p1.BB4* | 235 | func2_p0.BB3: T | #38 |
| #35 | func2_p0.BB5 | func2_p1.BB7 | 235 | func2_p0.BB3: F | #39 |
| #36 | func2_p0.BB4 | func2_p1.BB6 | | func2_p1.BB3: T | #40, #20 |
| #37 | func2_p0.BB7 | func2_p1.BB6 | | func2_p1.BB3: F | #21 |
| #38 | func2_p0.BB6 | *func2_p1.BB4* | | func2_p0.BB3: T | #22 |
| #39 | func2_p0.BB6 | func2_p1.BB7 | | func2_p0.BB3: F | #23 |
| #40 | *func2_p0.BB5* | func2_p1.BB6 | 234 | func2_p1.BB3: T | #24 |

The parallel program 23p starts by executing func2_p0.BB1 on thread 1 (cf. CFG 23p1) and func2_p1.BB1 on thread 2 (cf. CFG 23p2). The initial state #1 is added to the set of thread states in Table 8.

The possible next states from #1 can be calculated by either moving thread 1 or thread 2 to the respective following basic block within the respective CFG. The reason is that one does not know how long a processor needs to actually execute func2_p0.BB1 or func2_p1.13131. If thread 1 is faster than thread 2, the following state is #2. Otherwise, the following state is #3 (cf. column "Next States" of Table 8 for state #1). The next (or following) states for a given state are determined by the corresponding edges in the respective CFGs. Both possible states #2, #3 are then added to the set in Table 8.

From state #2, the following states #4 and #5 are calculated.

From state #3, the following states #5 and #6 are calculated. Since #5 is already in the set of reachable states, only #6 is added.

In state #4, func2_p0.BB3 from thread 1 contains an if condition, whose result determines which of two basic blocks is executed next, adding states #7 and #8. Since func2_p0.BB3 and func2_p1.BB3 are interlocked, a branch constraint is assigned to states #7 and #8. Furthermore, state #9 is added by stepping (executing) thread 2.

From state #7, the following states #13 and #14 are calculated. In the transition from state #7 to #13, the basic block func2_p0.BB4—and in particular—the contained signal statement is executed. Because the basic block func2_p0.BB4 contains a signal statement (statement 2:), the execution of this signal statement fires a signal identified by ID 234. This signal ID is added to state #13 in the "Active Signals/Sends" column of Table 8.

Being in state #13, thread 1 cannot progress past func2_p0.BB5 since the signal with the ID 235 is missing (as the signal statement of thread 2 has not been executed yet). Thread 2 is still in func2_p1.BB1 and can only progress to func2_p1.BB2, resulting in the following state #19.

In state #20, the basic block of thread 2 has a branch constraint such that thread 2 can only progress to func2_p1.BB4 in state #25. The transition to func2_p1.BB7 is blocked by the constraint. In state #25, the branch constraint is removed. In general, branch constraints ensure that the two threads execute in lockstep, in the sense that they agree to follow the same control flow path when reaching a conditional branch: both threads proceed to execute either the true (T) or the false (F) branch, without diverging. That is, if one thread is executing the basic blocks within the loop starting at BB3 of both threads, this constraint is also enforced on the other thread via the corresponding branch constraint. In the context of the example of FIG. 5 this means that because func2_p1.BB3 progresses via the true path T of CFG 23p1 (branch constraint "func2_p1.BB3: T"), thread 2 is only allowed to progress via the true path T of CFG 23p2, too, thus resulting in state #25.

In state #27, thread 2 is in func2_p1.BB4 and signal ID 234 is set such that the wait statement of thread 2 can be executed. When progressing to the following state #28, the signal with ID 234 is removed. When executing the signal statement (statement 3:) of thread 2, a signal with the ID 235 is fired for which thread 1 has been waiting.

A person skilled in the art can calculate all other states of Table 8 in accordance with the above explained principles.

A data race condition may appear if one thread is writing to a shared memory location while another thread is accessing (reading or writing) the same memory location at the same time. From the analysis of the parallel program states, it is known which basic blocks may be executed at the same time. Therefore, the absence of data race conditions can be proven by checking the accessed memory locations for every basic block that may be executed in parallel. If one thread is writing to a shared memory location in a first basic block, no other thread is allowed to read or write the same memory location in a second basic block that may be executed at the same time as the first basic block.

In the example of the parallel program 23p, the global variable "global_var" is stored in shared memory and therefore shares the same memory location in thread 1 and thread 2. func2_p0.13134 and func2_p1.13135 are the only basic blocks that access "global_var" (read and write). Since func2_p0.13134 and func2_p1.13135 cannot execute in parallel given the set of all possible program states in Table 8, the program is free of data race conditions. In other words, there is no reachable state in which thread 1 executes func2_p0.13134 while thread 2 executes func2_p1.13135, thus ruling out unsynchronized access to "global_var".

Deadlock detection may be performed using at least two alternative implementations.

In a first implementation, deadlock detection is based on the reachability graph. Thereby, a thread is potentially blocked in a particular state if any basic block of the state comprises a blocking synchronization or communication statement (within the basic block of the state). For each thread, the method finds all states in which the respective thread is potentially blocked. If a particular thread is potentially blocked in state S and all states reachable from S, then the particular thread is deadlocked in state S. A parallel program is deadlock-free if no deadlock state exists within the reachability graph of the parallel program.

In the example of FIG. 5, the basic blocks func2_p0.BB4, func2_p0.BB5, func2_p1.BB4 and func2_p1.BB5 contain blocking synchronization or communication statements. Table 9 lists all states with potentially blocked threads as well as a respective path to a reachable state that is not potentially blocked.

The second condition can be checked by comparing control-flow dependencies. The basic blocks of each pair of linked communication or synchronization statements must correspond to an identical basic block of the sequential program. In that case, it is guaranteed that both basic blocks are always executed under the same condition.

Table 10 provides an overview of potential errors which may occur during parallelization of a sequential program with a parallelizer tool. The herein described checks for semantic equivalence of the derived parallel program and the original sequential program allow to detect such potential errors and prevent deployment of the parallel program to parallel processing units in case semantic equivalence of the derived parallel program and the original sequential program is not confirmed. In Table 10, the potential errors relate to situations where a mismatch is identified between a statement in the parallel program and a respective statement in

TABLE 9 states with blocking statements

| State | Basic Block of Blocking Statement | Path to a State that is not Potentially Blocked |
|---|---|---|
| #7 | func2_p0.BB4 | #7 => #13 => #19 => #24 => #27 => #28 => #29 => #30 |
| #13 | func2_p0.BB5 | #13 => #19 => #24 => #27 => #28 => #29 => #30 |
| #14 | func2_p0.BB4 | #14 => #19 => #24 => #27 => #28 => #29 => #30 |
| #19 | func2_p0.BB5 | #19 => #24 => #27 => #28 => #29 => #30 |
| #20 | func2_p0.BB4 | #20 => #24 => #27 => #28 => #29 => #30 |
| #24 | func2_p0.BB5 | #24 => #27 => #28 => #29 => #30 |
| #25 | func2_p0.BB4 | #25 => #27 => #28 => #29 => #30 |
| #27 | func2_p0.BB5 | #27 => #28 => #29 => #30 |
| #28 | func2_p0.BB4 | #28 => #29 => #30 |
| #29 | func2_p0.BB5 | #29 => #30 |
| #31 | func2_p0.BB5 | #31 => #33 |
| #34 | func2_p0.BB5 | #34 => #38 |
| #35 | func2_p0.BB5 | #35 => #39 |
| #36 | func2_p0.BB4 | #36 => #40 => #24 => #27 => #28 => #29 => #30 |
| #40 | func2_p0.BB5 | #40 => #24 => #27 => #28 => #29 => #30 |
| #11 | func2_p1.BB4 | #11 => #17 => #22 => #25 => #27 => #28 => #29 |
| #17 | func2_p1.BB4 | #17 => #22 => #25 => #27 => #28 => #29 |
| #22 | func2_p1.BB4 | #22 => #25 => #27 => #28 => #29 |
| #25 | func2_p1.BB4 | #25 => #27 => #28 => #29 |
| #27 | func2_p1.BB4 | #27 => #28 => #29 |
| #28 | func2_p1.BB5 | #28 => #29 |
| #34 | func2_p1.BB4 | #34 => #38 => #22 => #25 => #27 => #28 => #29 |
| #38 | func2_p1.BB4 | #38 => #22 => #25 => #27 => #28 => #29 |

The parallel program 23p of the example is deadlock-free because for every state in which a thread is potentially blocked, there exists a path to state that is not potentially blocked.

In a second implementation, deadlock-freedom is detected if both of the following conditions are true:
1. within the reachability graph no state exists with a circular wait; and
2. for each pair of linked communication or synchronization statements (communication or synchronization statements that belong together, such as a SEND and corresponding RECV to exchange data between two processors, or a SIGNAL and corresponding WAIT to synchronize execution of two processors), the execution condition is identical.

The first condition can be checked using the reachability graph. A first thread is waiting for a second thread after executing a first blocking synchronization or communication statement that is waiting for a second linked synchronization or communication statement executed by a second thread. A state has a circular wait if two or more threads in a state form a circular list or chain where each thread is waiting on the next thread in the list.

the sequential program. For example, the object mapping algorithm may be unable to find a corresponding (matching) statement in the sequential program because of mismatched TYPE or mismatched dependencies.

There is no need to check the parallel program for livelocks or starvation. A livelock or starvation is defined as a situation in which a thread or process is not deadlocked and yet fails to make progress, where progress is defined as executing so-called progress statements, such as communication or input and output operations. Livelock or starvation situations may already exist in sequential programs, e.g., in the form of infinite loops that do nothing. For semantic equivalence, the parallelizer must not introduce additional livelock or starvation situations into the parallel program. Additional livelock or starvation situations in the parallel program may appear only if control flow is added or modified. However, the object mapping algorithm guarantees that no such additional or modified control flow is present in the parallel program, and thus, no extra livelock or starvation check is necessary.

TABLE 10

Potential errors during parallelization

| Error | Detection Method |
|---|---|
| Changed statement | Statement is not matched because of different TYPE, or Statement is not matched because of different dependencies |
| Additional statement | Statement has no corresponding statement in the sequential program, or Statement is not matched because of different dependencies |
| Deleted statement | Statement that depends on the statement is not matched |
| Misplaced statements | Statement is not matched because of different dependencies, or Statement that depends on the statement is not matched |
| Changed control flow | Statements that depend on the control flow are not matched, or Control flow statements are not matched |
| Additional control flow | Control flow statements are not matched |
| Missing communication | A statement that depends on the data of the communication is not matched |
| Missing synchronization | Data race condition is detected |
| Additional communication | Deadlock is detected, or A statement that depends on the statement is not matched |
| Additional synchronization | Deadlock is detected |
| Missing single communication or synchronization statement | Incorrect communication or synchronization statement is detected |
| Additional single communication or synchronization statement | Incorrect communication or synchronization statement is detected |
| Incorrect communication or synchronization statement | Incorrect communication or synchronization statement is detected |
| Misplaced communication statement | Deadlock is detected, or A statement that depends on the data of the communication is not matched |
| Misplaced synchronization statement | Deadlock is detected, or Data race condition is detected |

Figure 6:
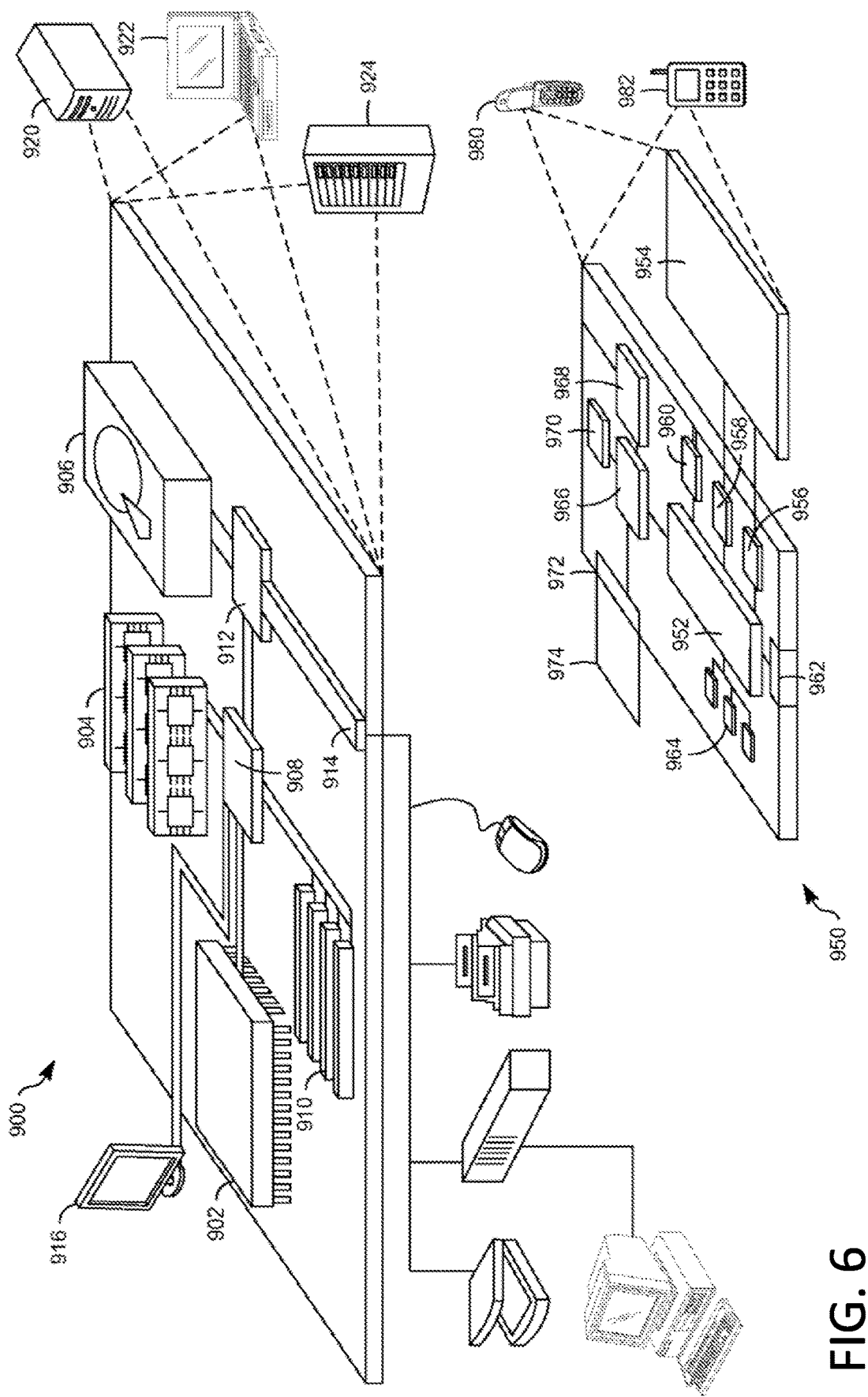
FIG. 6 is a diagram that shows an example of a generic computer device and a generic mobile computer device, which may be used with the techniques described here.

FIG. 6 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device 900 may correspond to the computer system 100 of FIG. 1. Computing device 950 is intended to represent various forms of mobile devices, such as personal digital assistants, cellular telephones, smart phones, and other similar computing devices. For example, computing device 950 may include the data storage components and/or processing components of agent devices as shown in FIG. 1. The components shown here, their connections and relationships, and their functions, are meant to be exemplary only, and are not meant to limit implementations described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid-state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high-speed controller 908 manages bandwidth-intensive operations for the computing device 900, while the low-speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In-Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship with each other.

A number of embodiments have been described. Nevertheless, it will be understood that various modifications may be made without departing from the spirit and scope of the claims.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The invention claimed is:

1. A computer-implemented method for validation of correct derivation of a parallel program from a sequential program for deployment of the parallel program to a plurality of processing units, the method comprising:
    computing, from code of the sequential program, a first control flow graph representing all paths that can be traversed through an execution of the sequential program, and determining dependencies within the first control flow graph, wherein a particular dependency between two statements involves a first statement and a second statement wherein the second statement depends on a result of the first statement;
    computing, from the code of the parallel program, further control flow graphs with a further control flow graph for each thread or process of the parallel program, with each thread or process having its own entry point and running independently, the further control flow graphs representing all paths that can be traversed through the execution of the parallel program, and determining dependencies within the further control flow graphs;
    checking if the derived parallel program and the sequential program are semantically equivalent by comparing the respective control flow graphs and dependencies to prove either:
        that each relevant statement in the parallel program corresponds to an identical statement in the sequential program, wherein a relevant statement in the parallel program is any statement which is not only employed to synchronize control flow or exchange data, and wherein a sequential statement in the sequential program is identical to a parallelized statement in the parallel program if the sequential statement and parallelized statement:
            perform a same calculation,
            have corresponding dependencies in that, for a dependency of the sequential statement on a further sequential statement, and a corresponding dependency of the parallelized statement on a further parallelized statement, the further sequential statement corresponds to the further parallelized statement;
        or:
            that output data of the sequential program and the parallel program are computed by identical instructions, wherein two instructions are identical if:
        both instructions perform the same calculation,
        both instructions are executed under same conditions,
        input data of both instructions are computed by identical instructions or correspond to identical input data of the sequential program and the parallel program; and
    if the derived parallel program and the sequential program are semantically equivalent, setting a correct derivation state for the parallel program, which qualifies the parallel program for deployment.

2. The method of claim 1, wherein computing the further control flow graphs further comprises:
    in case the derived parallel program is adapted to use shared memory, adding respective control flow edges between corresponding basic blocks of two further control flow graphs, with the corresponding basic blocks representing instructions employed to synchronize execution of multiple processing units.

3. The method of claim 1, wherein computing the further control flow graphs further comprises:
    in case the parallel program comprises message-passing instructions for communication including message-receiving instructions and corresponding message-sending instructions, wherein a first parallelized instruction of a first further control flow graph has an effective dependency on a second parallelized instruction of a second further control flow graph if the first parallelized instruction depends on data received by a message-receiving instruction of the first further control flow graph and if the data sent by the corresponding message-sending instruction of the second further control flow graph depends on the second parallelized instruction, replacing any dependencies on message-receiving instructions by the corresponding effective dependencies.

4. The method of claim 1, with the parallel program derived by a parallelizer tool which does not guarantee that generated synchronization instructions or communication instructions are correct, further comprising:

checking each synchronization instruction of the parallel program if it is correct in that it synchronizes the control flow of the parallel program, and checking each communication instruction of the parallel program if it is correct in that it exchanges data between threads of the parallel program; and determining that the derived parallel program and the sequential program are semantically equivalent if all checks deliver a positive result.

5. The method of claim 1, with the parallel program derived by a parallelizer tool which does not guarantee that the derived parallel program is free of data race conditions, the method further comprising:

checking that the parallel program is free of data race conditions by computing which basic blocks in the control flow of the parallel program can theoretically be executed at the same time, and by validating that, for each simultaneously executable basic block, each memory location is only accessed by a particular thread while the particular thread is writing to the memory location; and determining that the derived parallel program and the sequential program are semantically equivalent if all checks deliver a positive result.

6. The method of claim 1, with the parallel program derived by a parallelizer tool which does not guarantee that the derived parallel program is free of deadlocks, the method further comprising:

checking that the parallel program is free of deadlocks by computing which basic blocks of the parallel program can theoretically be executed at the same time, and by validating that, for each simultaneously executable basic block, no circular wait between these basic blocks exists; and determining that the derived parallel program and the sequential program are semantically equivalent if all checks deliver a positive result.

7. The method of claim 1, wherein, when computing the further control flow graphs, a function of the sequential program is split into functions represented by the further control flow graphs to be executed in parallel by respective processing units.

8. A computer system for validation of correct derivation of a parallel program from a sequential program for deployment of the parallel program to a plurality of processing units, comprising:

an interface component configured to receive program code of the sequential program and the program code of the parallel program;

a static analysis component configured:
to compute, from the code of the sequential program, a first control flow graph representing all paths that can be traversed through an execution of the sequential program, and determining dependencies within the sequential program code, wherein a particular dependency between two statements involves a first statement and a second statement wherein the second statement depends on a result of the first statement; and to compute, from the code of the parallel program, further control flow graphs with a further control flow graph for each thread or process of the parallel program, with each thread or process having its own entry point and running independently, the further control flow graphs representing all paths that can be traversed through the execution of the parallel program, and determining dependencies within the further control flow graphs;

a checking component configured to check if the sequential program and the derived parallel program are semantically equivalent by comparing the respective first and further control flow graphs and respective dependencies to prove:

either
that each relevant statement in the parallel program corresponds to an identical statement in the sequential program, wherein a relevant statement in the parallel program is any statement which is not only employed to synchronize control flow or exchange data, and wherein a sequential statement in the sequential program is identical to a parallelized statement in the parallel program if the sequential statement and parallelized statement:

perform a same calculation, have corresponding dependencies in that, for a dependency of the sequential statement on a further sequential statement, and a corresponding dependency of the parallelized statement on a further parallelized statement, the further sequential statement corresponds to the further parallelized statement;

or
that output data of the sequential program and the parallel program are computed by identical instructions, wherein two instructions are identical if:

both instructions perform the same calculation, both instructions are executed under the same conditions, input data of both instructions are computed by identical instructions or correspond to identical input data of the sequential program and the parallel program; and a release component configured to set a correct derivation state for the parallel program to qualify the parallel program for deployment if the derived parallel program and the sequential program are semantically equivalent.

9. The system of claim 8, wherein the static analysis component is further configured to add to further control flow graphs respective control flow edges between corresponding basic blocks of two further control flow graphs, with the corresponding basic blocks representing instructions employed to synchronize control flow of multiple processing units in case the parallel program is adapted to use shared memory.

10. The system of claim 8, wherein the static analysis component is further configured to:

in case the parallel program comprises message-passing instructions for communication including message-receiving instructions and corresponding message-sending instructions, wherein a first parallelized instruction of a first further control flow graph has an effective dependency on a second parallelized instruction of a second further control flow graph if the first parallelized instruction depends on data received by a message-receiving instruction of the first further control flow graph and if the data sent by the corresponding message-sending instruction of the second further control flow graph depends on the second parallelized instruction, replace any dependencies on message-receiving instructions by the corresponding effective dependencies.

11. The system of claim 8, with the parallel program derived by a parallelizer tool which does not guarantee that generated synchronization instructions or communication instructions are correct, the checking component further configured to:

check each synchronization instruction of the parallel program if it is correct in that it synchronizes the control flow of the parallel program, and check each communication instruction of the parallel program if it is correct in that it exchanges data between threads of the parallel program; and determine that the derived parallel program and the sequential program are semantically equivalent if all checks deliver a positive result.

12. The system of claim 8, with the parallel program derived by a parallelizer tool which does not guarantee that the derived parallel program is free of data race conditions, the checking component further configured to:

check that the parallel program is free of data race conditions by computing which basic blocks in the control flow of the parallel program can theoretically be executed at the same time, and validate that, for each simultaneously executable basic block, each memory location is only accessed by a particular thread while the particular thread is modifying the memory location; and determine that the derived parallel program and the sequential program are semantically equivalent if all checks deliver a positive result.

13. The system of claim 8, with the parallel program derived by a parallelizer tool which does not guarantee that the derived parallel program is free of deadlocks, the checking component further configured to:

check that the parallel program is free of deadlocks by computing which basic blocks of the parallel program can theoretically be executed at the same time, and validate that, for each simultaneously executable basic block, no circular wait between these basic blocks exists; and determine that the derived parallel program and the sequential program are semantically equivalent if all checks deliver a positive result.

14. The system of claim 8, wherein the static analysis component is further configured, when computing the further control flow graphs, to split a function of the sequential program into functions represented by the further control flow graphs to be executed in parallel by respective processing units.

15. A computer program product comprising a non-transitory computer readable medium for validation of correct derivation of a parallel program from a sequential program for deployment of the parallel program to a plurality of processing units, which, when loaded into a memory of a computing device and executed by at least one processor of the computing device, causes the at least one processor to:

compute, from code of the sequential program, a first control flow graph representing all paths that can be traversed through an execution of the sequential program, and determining dependencies within the first control flow graph, wherein a particular dependency between two statements involves a first statement and a second statement wherein the second statement depends on a result of the first statement;

compute, from the code of the parallel program, further control flow graphs with a further control flow graph for each thread or process of the parallel program, with each thread or process having its own entry point and running independently, the further control flow graphs representing all paths that can be traversed through the execution of the parallel program, and determining dependencies within the further control flow graphs;

check if the derived parallel program and the sequential program are semantically equivalent by comparing the respective control flow graphs and dependencies dependencies to prove:

either that each relevant statement in the parallel program corresponds to an identical statement in the sequential program, wherein a relevant statement in the parallel program is any statement which is not only employed to synchronize control flow or exchange data, and wherein a sequential statement in the sequential program is identical to a parallelized statement in the parallel program if the sequential statement and parallelized statement:

perform a same calculation, have corresponding dependencies in that, for a dependency of the sequential statement on a further sequential statement, and a corresponding dependency of the parallelized statement on a further parallelized statement, the further sequential statement corresponds to the further parallelized statement;

or that output data of the sequential program and the parallel program are computed by identical instructions, wherein two instructions are identical if:

both instructions perform the same calculation, both instructions are executed under same conditions, input data of both instructions are computed by identical instructions or correspond to identical input data of the sequential program and the parallel program; and if the derived parallel program and the sequential program are semantically equivalent, set a correct derivation state for the parallel program, which qualifies the parallel program for deployment.

\* \* \* \* \*